United States Patent
Shrivastava et al.

(10) Patent No.: US 11,930,377 B2
(45) Date of Patent: Mar. 12, 2024

(54) METHOD AND SYSTEM FOR ENABLING DISTRIBUTED CACHING IN WIRELESS NETWORK

(71) Applicant: SAMSUNG ELECTRONICS CO., LTD., Suwon-si (KR)

(72) Inventors: Vinay Kumar Shrivastava, Karnataka (IN); Diwakar Sharma, Karnataka (IN); Rohan Raj, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 389 days.

(21) Appl. No.: 17/282,932

(22) PCT Filed: Oct. 7, 2019

(86) PCT No.: PCT/KR2019/013130
§ 371 (c)(1),
(2) Date: Apr. 5, 2021

(87) PCT Pub. No.: WO2020/071882
PCT Pub. Date: Apr. 9, 2020

(65) Prior Publication Data
US 2022/0014937 A1 Jan. 13, 2022

(30) Foreign Application Priority Data
Oct. 5, 2018 (IN) .............................. 201841037871

(51) Int. Cl.
*H04W 24/02* (2009.01)
*H04L 67/568* (2022.01)
(Continued)

(52) U.S. Cl.
CPC ........... *H04W 24/02* (2013.01); *H04L 67/568* (2022.05); *H04W 4/06* (2013.01); *H04W 24/08* (2013.01);
(Continued)

(58) Field of Classification Search
CPC ...... H04W 24/02; H04W 24/06; H04W 24/08
See application file for complete search history.

(56) References Cited

U.S. PATENT DOCUMENTS

| 10,687,553 | B2 | 6/2020 | Kaufman et al. |
| 2008/0089299 | A1 | 4/2008 | Lindsley et al. |
| 2009/0144417 | A1 | 6/2009 | Kisel et al. |
| 2012/0023226 | A1 | 1/2012 | Petersen et al. |

(Continued)

FOREIGN PATENT DOCUMENTS

| CN | 107534854 | 1/2018 |
| EP | 2670109 | 12/2013 |
| KR | 10-2016-0124853 | 10/2016 |

OTHER PUBLICATIONS

Ji Mingyue et al., "Wireless Device-to-Device Caching Networks: Basic Principles and System Performance", IEEE, vol. 34, No. 1, pp. 176-189 (Year: 2016).*

(Continued)

*Primary Examiner* — Clayton R Williams
(74) *Attorney, Agent, or Firm* — F. CHAU & ASSOCIATES, LLC

(57) ABSTRACT

Embodiments herein disclose a method for enabling distributed caching in a wireless network. The method includes receiving, by an edge node (100) in the wireless network, a plurality of contents from a core network (1000) and determining, by the edge node (100), popular content from the plurality of contents. Further, the method also includes caching, by the edge node (100), the popular content in the edge node and transferring, by the edge node (100), at least one segment of the popular content for caching to at least one UE (200) of a plurality of UEs associated with the edge node.

20 Claims, 13 Drawing Sheets

(51) Int. Cl.
- *H04W 4/06* (2009.01)
- *H04W 24/08* (2009.01)
- *H04W 40/24* (2009.01)
- *H04W 88/04* (2009.01)

(52) U.S. Cl.
CPC .......... *H04W 40/246* (2013.01); *H04W 88/04* (2013.01)

(56) References Cited

U.S. PATENT DOCUMENTS

| | | |
|---|---|---|
| 2013/0054729 A1 | 2/2013 | Jaiswal et al. |
| 2013/0097236 A1 | 4/2013 | Khorashadi et al. |
| 2015/0304445 A1 | 10/2015 | Sahar |
| 2016/0182582 A1* | 6/2016 | Wagenaar ............... H04L 65/65 709/231 |
| 2017/0019495 A1* | 1/2017 | Bennis ................ H04L 67/1051 |
| 2017/0214761 A1* | 7/2017 | Hsu ................... H04W 28/0231 |
| 2018/0077257 A1 | 3/2018 | Wang et al. |

OTHER PUBLICATIONS

Vinay Kumar Shrivastava, et al., "Enabling Broadcast-Based Offload and Distributed Caching for Mobile Social Networks," 2020 IEEE 17th Annual Consumer Communications & Networking Conference (CCNC), Mar. 26, 2020, pp. 1-6.

Vinay Kumar Shrivastava, et al., "Unified Service Delivery Framework for 5G Edge Networks," 2018 IEEE Wireless Communications and Networking Conference (WCNC), Apr. 15-18, 2018, pp. 1-6.

Hye J. Kang, et al., "Mobile Caching Policies for Device-to-Device (D2D) Content Delivery Networking." 2014 IEEE Infocom Workshop on Dynamic Social Networks, pp. 299-304.

Vinay Kumar Shrivastava, et al., "Enabling Broadcast-Based Offload and Distributed Caching for Mobile Social Networks," 2020 IEEE 17th Annual Consumer Communications & Networking Conference (CCNC), pp. 1-6.

Anonymous: "Multi-hop routing—Wikipedia", Wikipedia—The free Encyclopedia, Oct. 29, 2017 (Oct. 29, 2017), XP093037636,Retrieved from the Internet: URL:https://en.wikipedia.org/w/index.php?title=Multi-hop_routing&oldid=807693688[retrieved on Apr. 5, 2023].

Lo A et al: "Multi-hop relay architectures for 3GPP-LTE—advanced", Communications (MICC), 2009 IEEE 9th Malaysia International Conference On, IEEE, Piscataway, NJ, USA, Dec. 15, 2009 (Dec. 15, 2009), pp. 123-127, XP031648577,ISBN: 978-1-4244-5531-7.

Office Action dated Nov. 7, 2023 in corresponding Chinese Patent Application No. 201980065724.5, 13 pages (in Chinese).

* cited by examiner

[Figure 3]
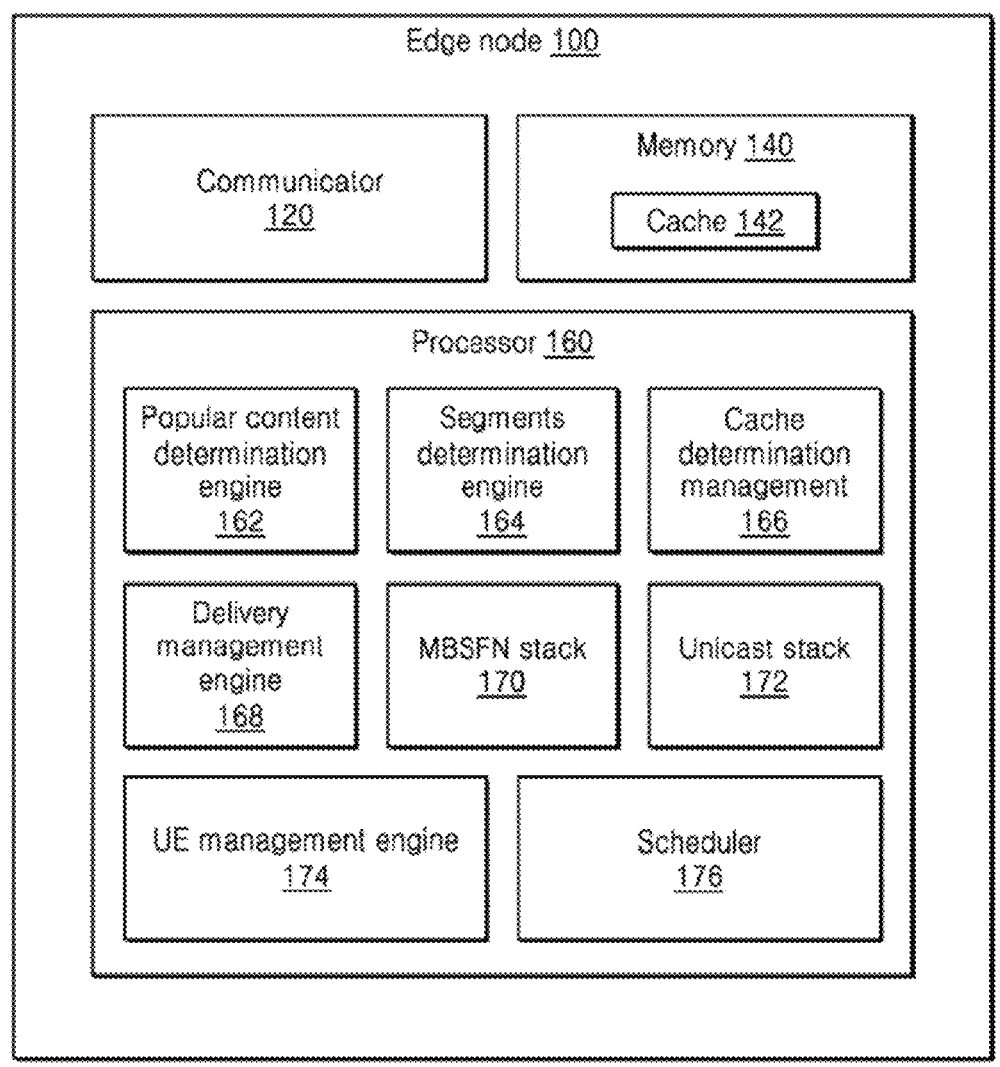

[Figure 4]
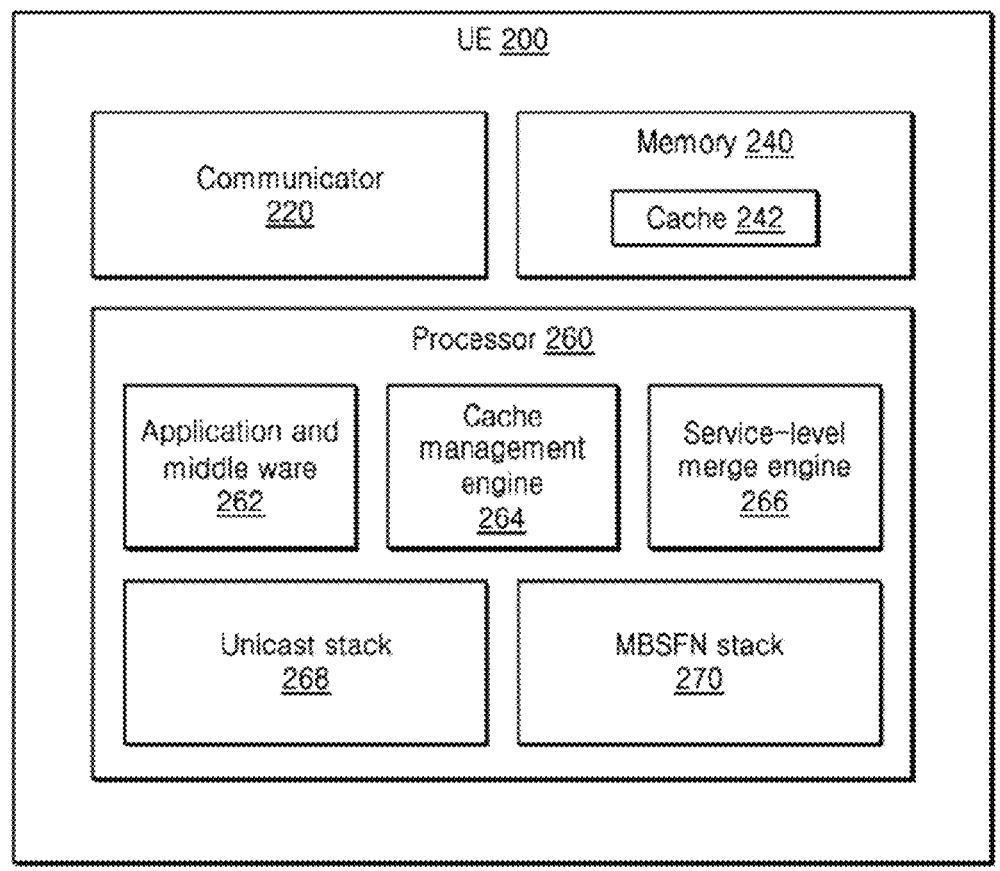

[Figure 5]
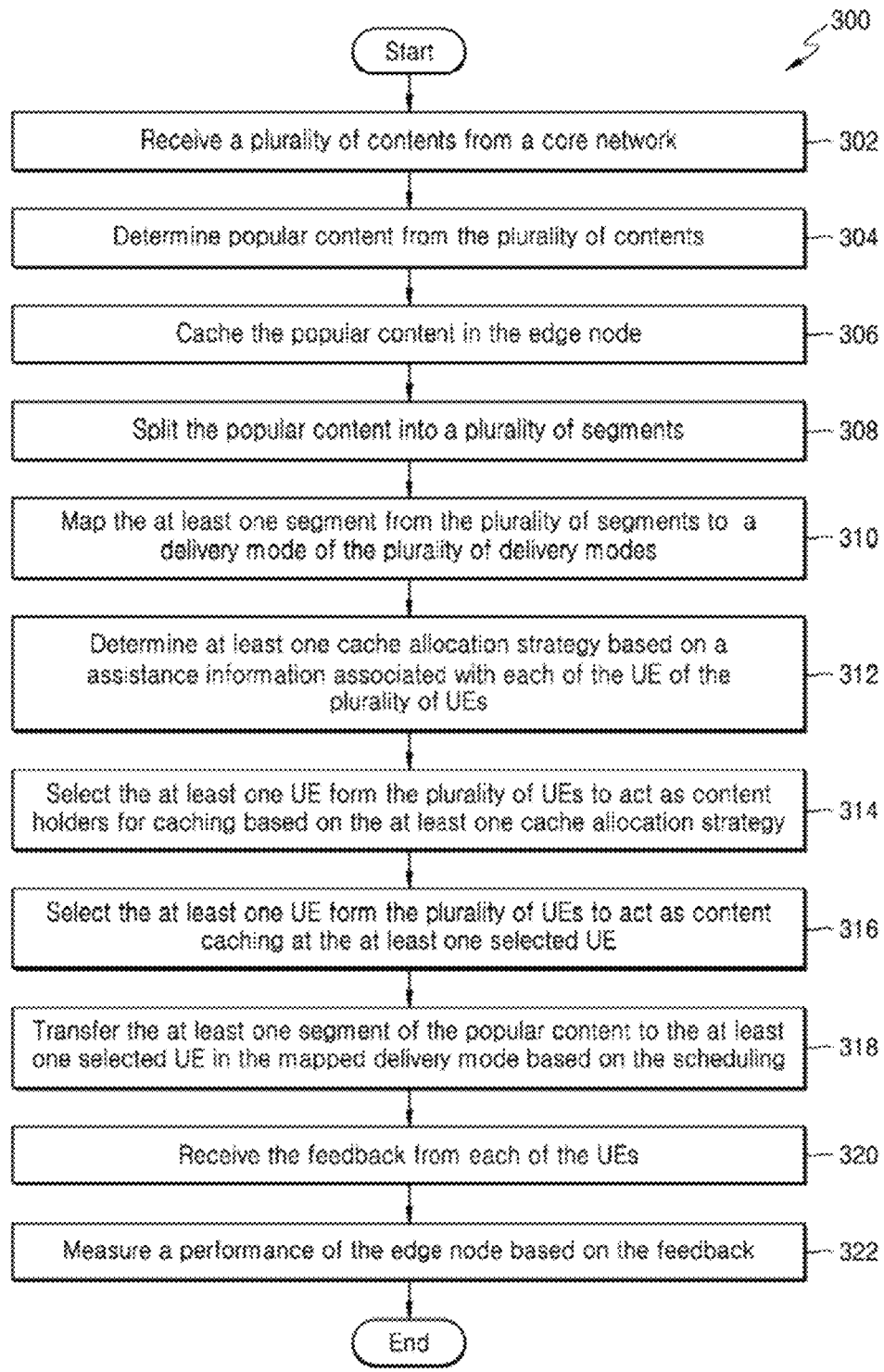

[Figure 6]
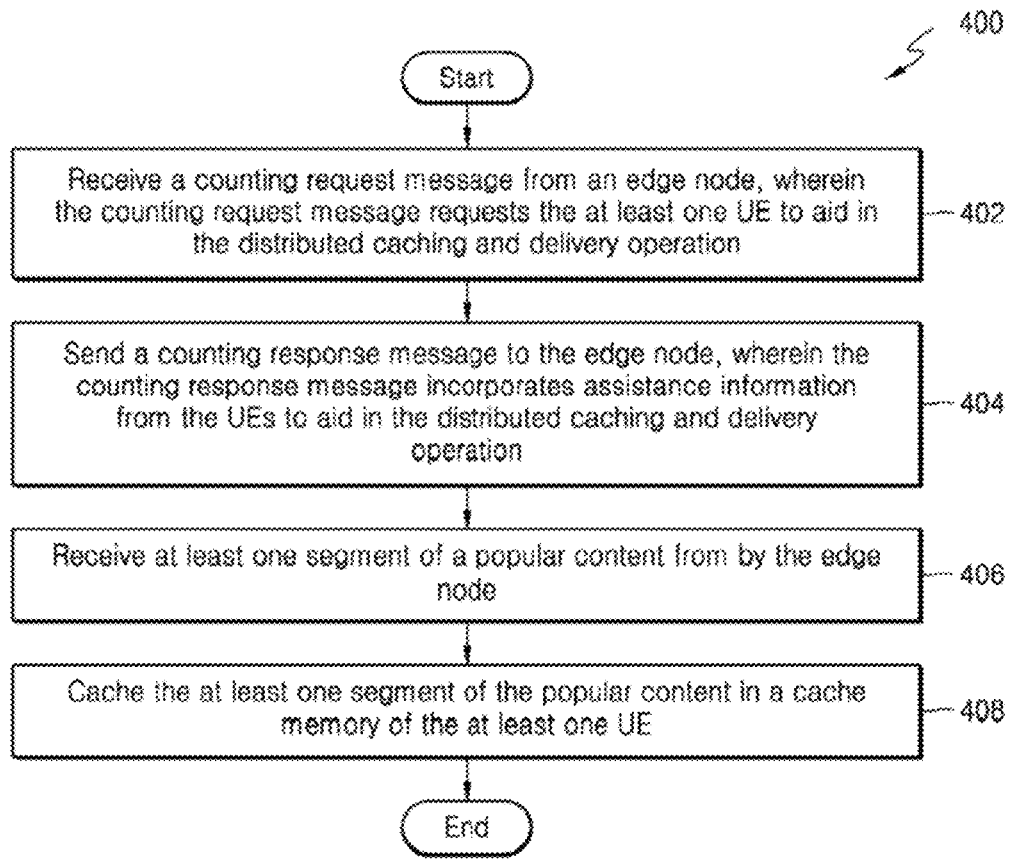
[Figure 7]
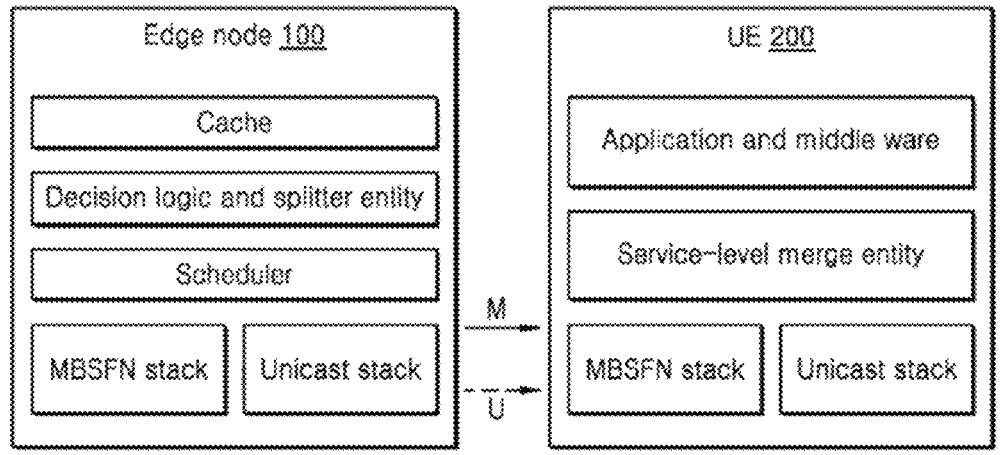

[Figure 8B]
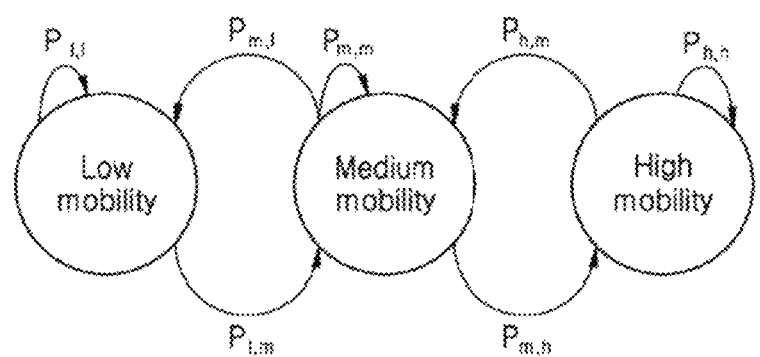

[Figure 10A]
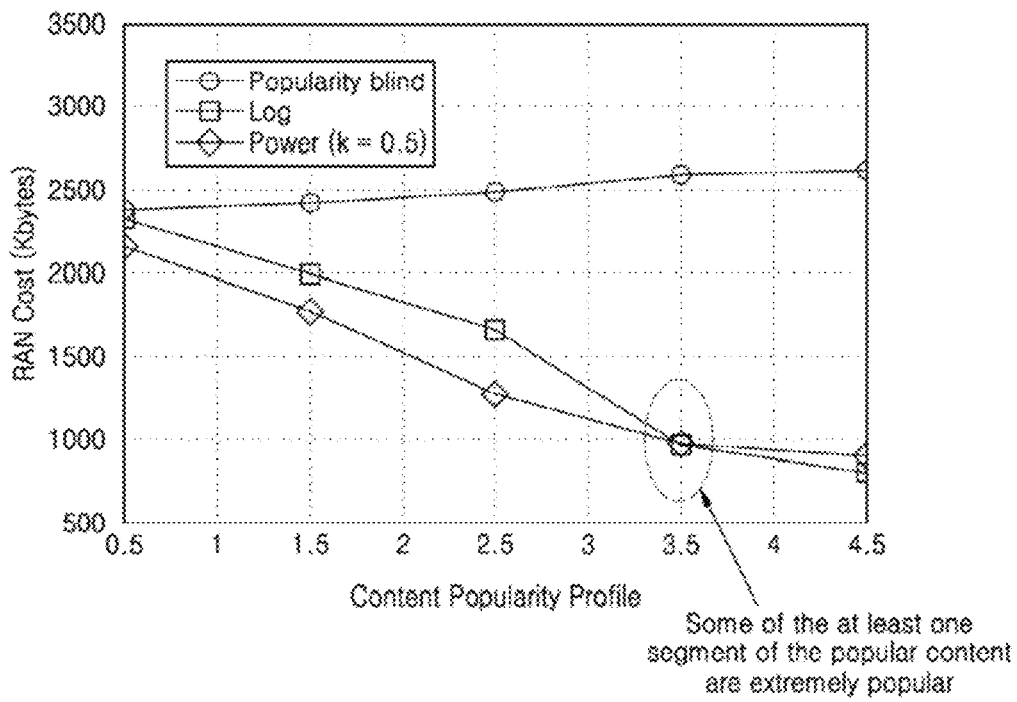
[Figure 10B]
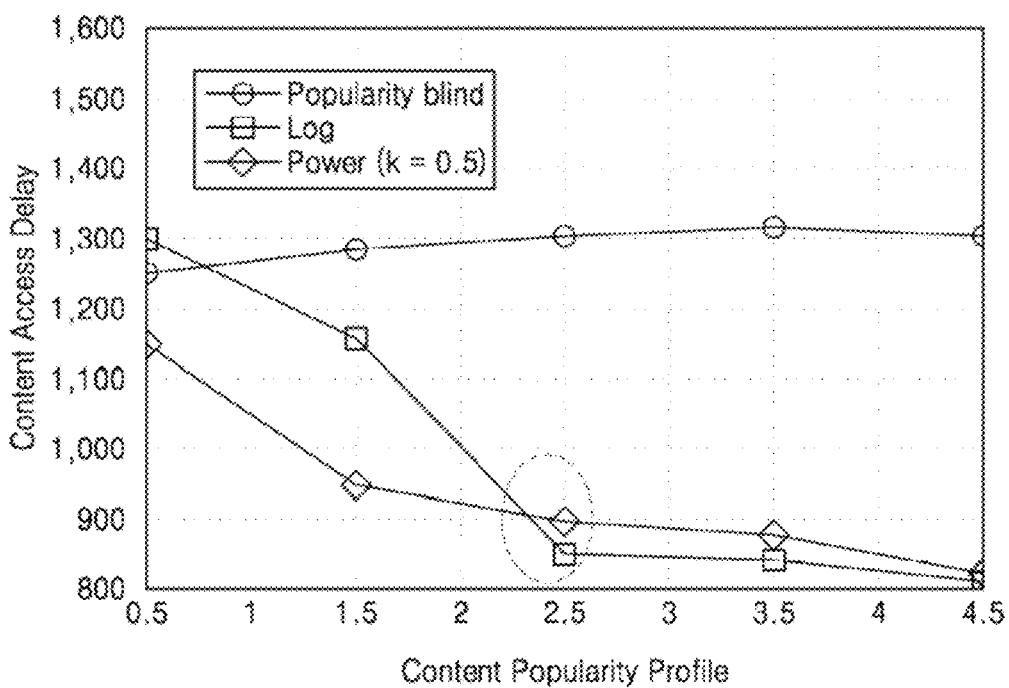

[Figure 10C]
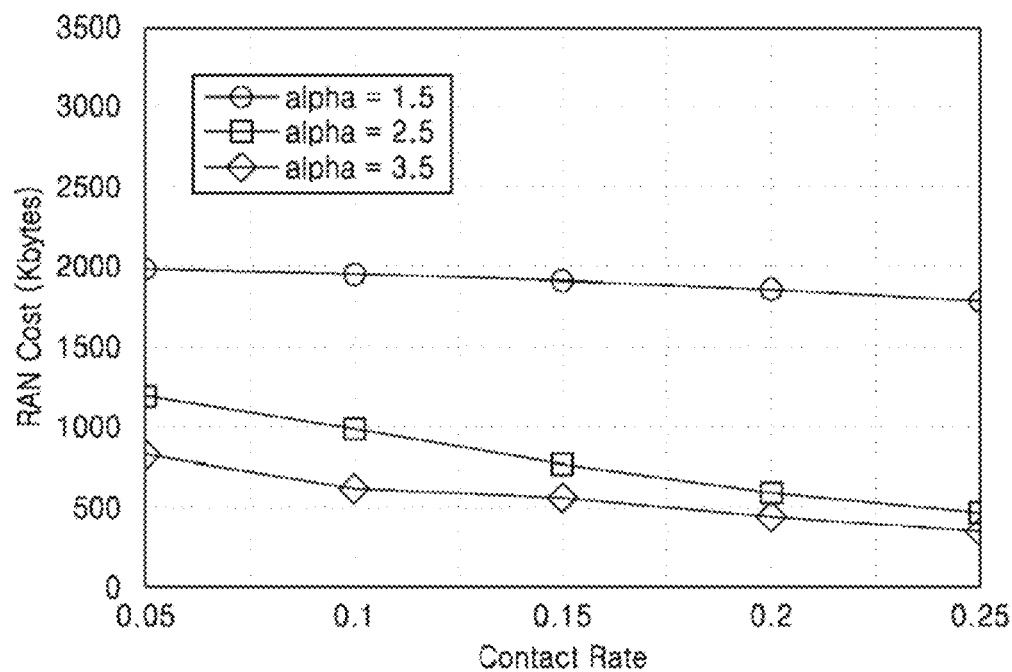
[Figure 10D]
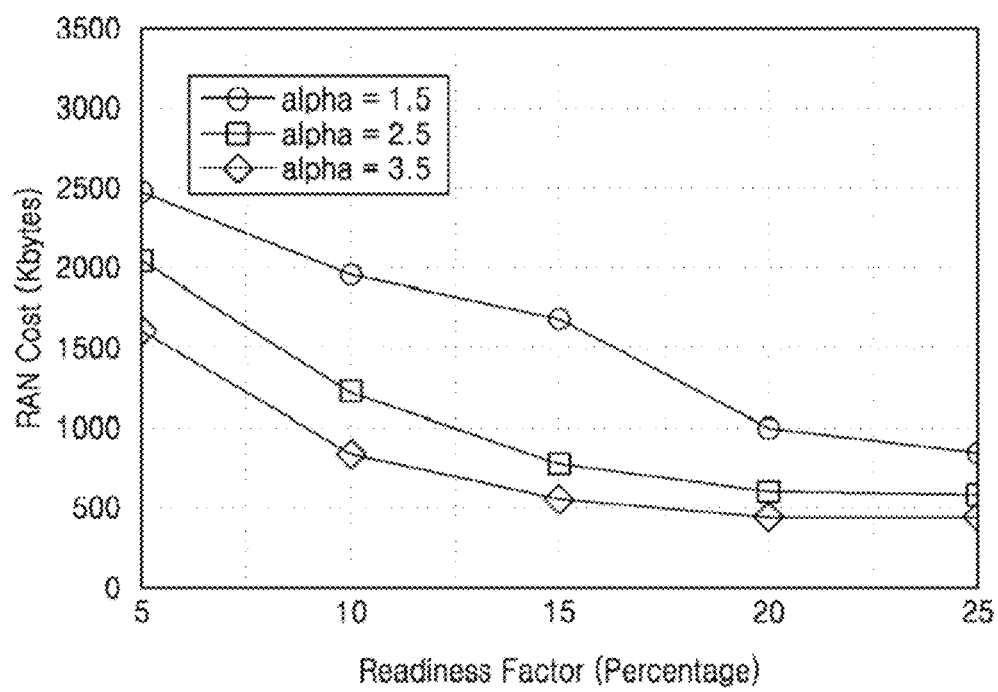

[Figure 10E]
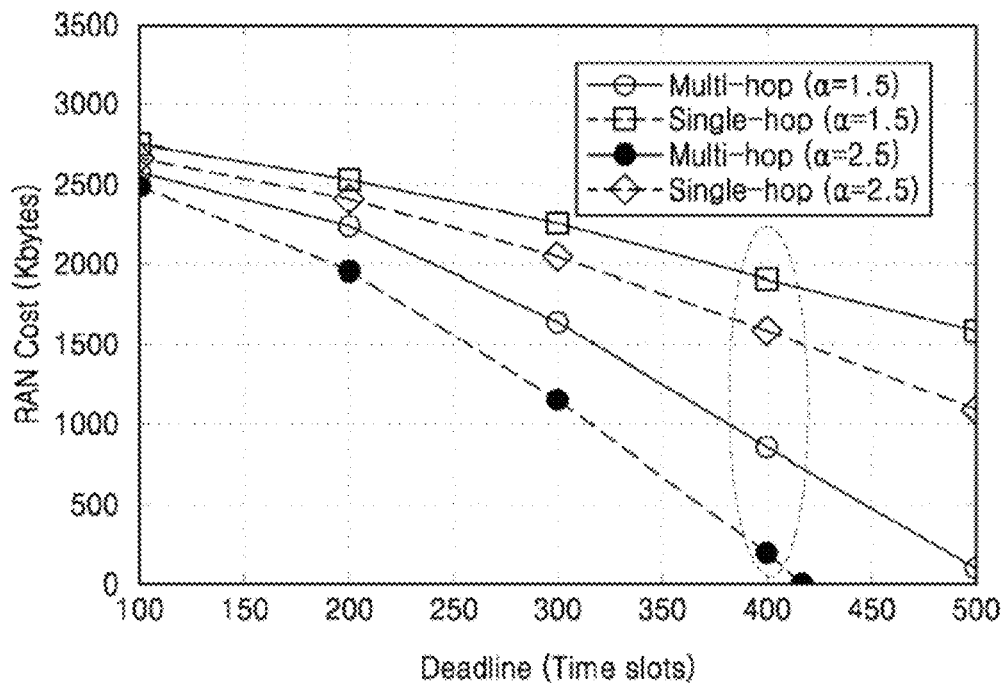
[Figure 10F]
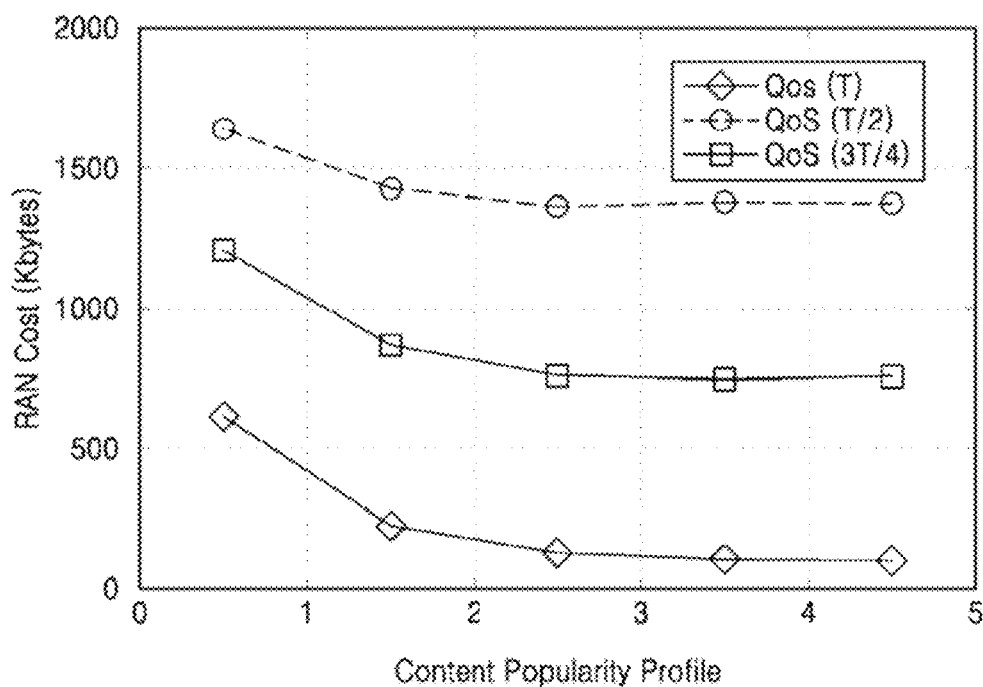

[Figure 10G]
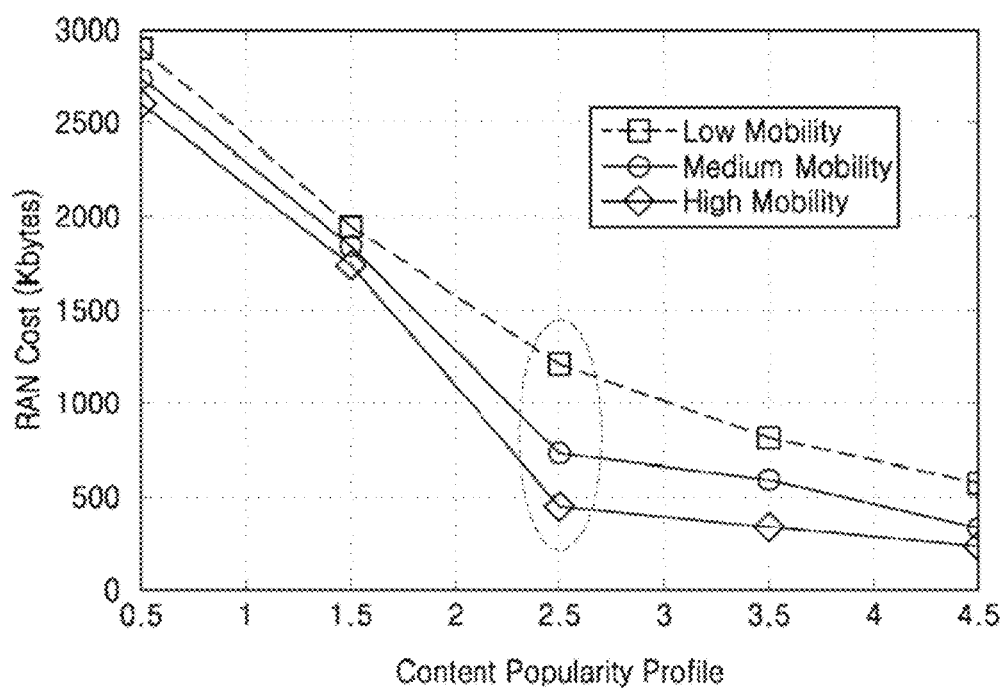

METHOD AND SYSTEM FOR ENABLING DISTRIBUTED CACHING IN WIRELESS NETWORK

TECHNICAL FIELD

The present disclosure relates to wireless communication, and more particularly to a method and system for enabling distributed caching in wireless network.

BACKGROUND ART

In general, with an explosive demand in the number of electronic devices and also increasing demand for higher data rates due to bandwidth-intensive social networking services over-the-top (OTT) applications and video-on-demand services etc., wireless networks are drastically burdened with the demand for wireless resources. One of the causes for the increase in mobile data traffic is transmission/reception of video content due to widespread use of the social networking services. Another cause for the increase in mobile data traffic is due to accessing of data mainly through unicast delivery mode of communication without the utilization of a multicast nature of content (as shown in FIG. 1).

DISCLOSURE

Technical Problem

Recently MBMS (Multimedia Broadcast Multicast Service) in LTE (Long Term Evolution) provides certain synchronous real time services like mobile television etc. by benefitting from point-to-multi-point (PTM) approach of delivering common contents to the electronic devices. However, there is no coordination between unicast delivery mode of communication and multicast delivery mode of communication in delivering services that enable optimum performance in terms of Quality of Service (QoS) as well as realizing power savings in the wireless networks. Also, the MBMS in the LTE experiences interruption during service switching and migration across the unicast delivery mode of communication and multicast delivery mode of communication.

Edge networks provide a possibility of caching and network based coded transmission that brings benefit from spectrum conservation perspective. However, the edge network does not utilize the broadcast delivery mode of communication in the network framework. Further, the caching and the network based coded transmission is not linked and exploited with respect to synchronous/asynchronous content access, latency needs, network scheduling parameters providing most optimum selection and use of different delivery modes. Also, the edge network does not consider a nature of the contents adequately while devising scheduling approach all which leads to excessive use of network resources and high power consumption.

Thus, it is desired to address the above mentioned disadvantages or other shortcomings or at least provide a useful alternative.

Technical Solution

The principal object of the embodiments herein is to provide a method for enabling distributed caching in a wireless network.

Another object of the embodiments herein is to determine popular content from the plurality of contents.

Another object of the embodiments herein is to cache the popular content in the edge node.

Another object of the embodiments herein is to transfer at least one segment of the popular content for caching to at least one UE of a plurality of UEs associated with the edge node.

Another object of the embodiments herein is to map at least one segment from plurality of segments to a delivery mode.

Another object of the embodiments herein is to cache the at least one segment of the popular content in a cache memory of the at least one UE.

Another object of the embodiments herein is to share the at least one segment of the popular content with other UEs in a device-to-device (D2D) cluster.

Another object of the embodiments herein is to select the at least one UE of the plurality of UEs based on a mobility dynamics of the plurality of UEs and a quality of service (QoS) constraints of the at least one UE selected for distributed caching.

Advantageous Effects

Unlike to the conventional methods and systems, in the proposed method the best set of UEs are selected for caching contents so that it results in maximization of the service coverage and also provide most optimized resource utilization with fulfilling the constraints of different user service requirements.

Unlike to the conventional methods and systems, in the proposed method effectively utilizes synchronous broadcast communication to serve asynchronous set of user requests.

Unlike to the conventional methods and systems, in the proposed method the network gathers information about specific UE's willingness to participate in the distributed caching process and signal the selected set of UEs for caching specific contents for a determined duration.

DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 3 illustrates a block diagram of an edge node (100) for enabling the distributed caching in the wireless network, according to an embodiment as disclosed herein;

FIG. 4 illustrates a block diagram of a UE (200) for enabling the distributed caching in the wireless network, according to an embodiment as disclosed herein;

FIG. 5 illustrates a flow diagram of a method for enabling the distributed caching in the wireless network by the edge node (100), according to an embodiment as disclosed herein;

FIG. 6 illustrates a flow diagram 400 of the method for enabling the distributed caching in the wireless network by the UE (200), according to an embodiment as disclosed herein;

FIG. 7 illustrates a service level multi-connectivity provided by the proposed method in the wireless communication network, according to an embodiment as disclosed herein;

FIG. 8B illustrates a Markov chain for UE mobility state used in a mobility driven allocation strategy at the edge node (100) of the wireless network, according to an embodiment as disclosed herein.

FIG. 10A is a graph illustrating a comparison of a RAN resource cost with respect to the plurality of cache allocation strategy at the edge node (100) in the wireless network, according to an embodiment as disclosed herein;

FIG. 10B is a graph illustrating a comparison of a content access delay with respect to the plurality of cache allocation strategy at the edge node (100) in the wireless network, according to an embodiment as disclosed herein;

FIG. 10C is a graph illustrating a comparison of the RAN resource cost with respect to the plurality of cache allocation strategy at the edge node (100) in the wireless network, according to an embodiment as disclosed herein;

FIG. 10D is a graph illustrating a comparison of the RAN resource cost with respect to a readiness factor of the plurality of UEs in the wireless network, according to an embodiment as disclosed herein;

FIG. 10E is a graph illustrating the RAN resource cost for single-hop and multi-hop communication in the wireless network, according to an embodiment as disclosed herein;

FIG. 10F is a graph illustrating the RAN resource cost for the plurality of segments with different popularity profile in case of contents with different quality of service (QoS) bounds in the wireless network, according to an embodiment as disclosed herein; and FIG. 10G is a graph illustrating the RAN resource cost for the plurality of segments with different popularity profile in case of contents based on different mobility in the wireless network, according to an embodiment as disclosed herein.

BEST MODE

Figure 1:
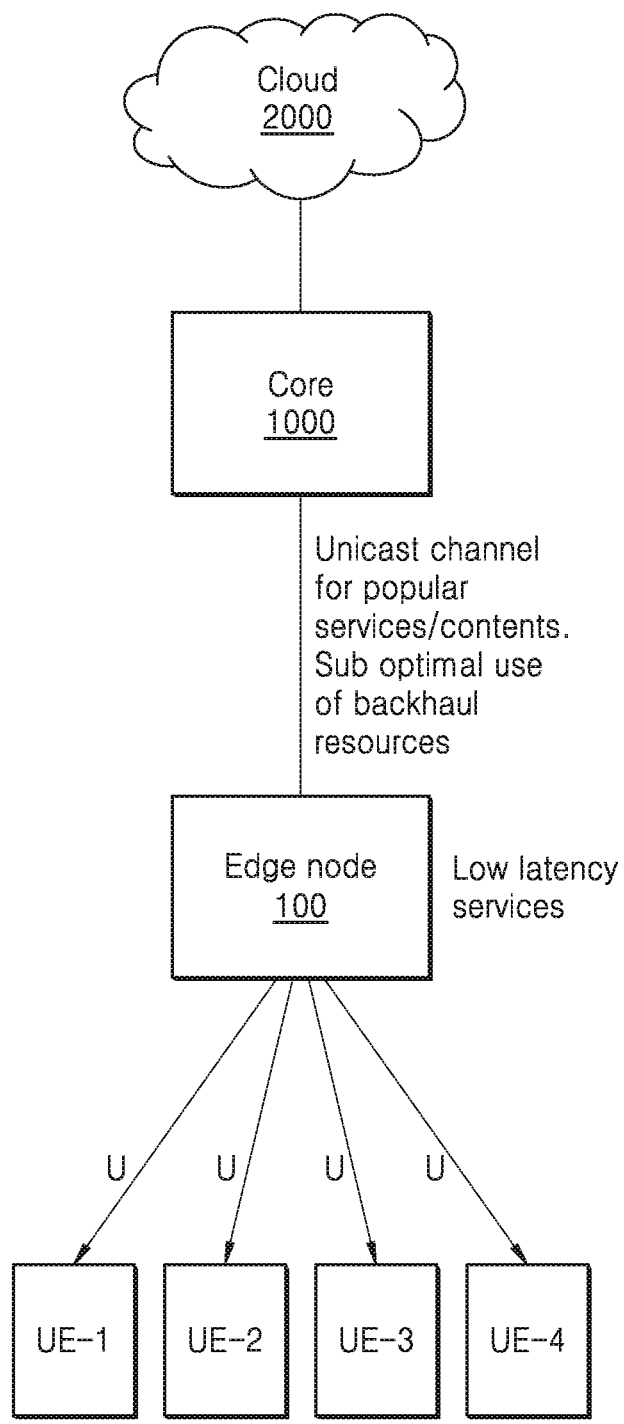
FIG. 1 illustrates a system in absence of distributed caching in a wireless network, according to a prior art.

Accordingly the embodiments herein disclose a method for enabling distributed caching in a wireless network. The method includes receiving, by an edge node (100) in the wireless network, a plurality of contents from a core network (1000) and determining, by the edge node (100), popular content from the plurality of contents. Further, the method also includes caching, by the edge node (100), the popular content in the edge node and transferring, by the edge node (100), at least one segment of the popular content for caching to at least one UE (200) of a plurality of UEs associated with the edge node.

In an embodiment, the method of transferring, by the edge node (100), the at least one segment of the popular content for caching to the at least one UE (200) of the plurality of UEs associated with the edge node (100) includes splitting, by the edge node (100), the popular content into a plurality of segments. The method also includes mapping, by the edge node (100), the at least one segment from the plurality of segments to a delivery mode from the plurality of delivery modes and determining, by the edge node (100), at least one cache allocation strategy based on a assistance information associated with each of the UE (200) of the plurality of UEs. Further, the method also includes selecting, by the edge node (100), the at least one UE (200) form the plurality of UEs to act as content holders for caching based on the at least one cache allocation strategy, the assistance information associated with each of the UE of the plurality of UEs, a popularity of the at least one segment of the popular content, a D2D cluster, a group of the at least one segment of the popular content and scheduling, by the edge node (100), a delivery of the at least one segment of the popular content for caching at the at least one selected UE (200). Furthermore, the method also includes transferring, by the edge node (100), the at least one segment of the popular content to the at least one selected UE (200) in the mapped delivery mode based on the scheduling.

In an embodiment, the delivery mode includes one of a broadcast delivery mode, a multicast delivery mode and a unicast delivery mode.

In an embodiment, the at least one cache allocation strategy is a popularity driven allocation strategy, a log scheme driven popular allocation strategy, power function of popularity scheme driven popularity allocation strategy and a mobility driven allocation strategy.

In an embodiment, the popularity blind allocation strategy is caching the at least one segment of the popular content at more UEs.

In an embodiment, the log function of popularity strategy is favoring the at least one segment of the popular content with higher popularity while performing cache allocation.

In an embodiment, the popularity blind allocation strategy is treating each segment of the popular content equally.

In an embodiment, the power function of popularity scheme driven popularity allocation strategy is favoring in accordance with a power function the at least one segment of the popular content with higher popularity while performing the cache allocation.

In an embodiment, the mobility driven allocation strategy is favoring the at least one UE with higher mobility to act as content holder for performing cache allocation.

In an embodiment, the assistance information associated with each of the UE (200) of the plurality of UEs are received at the edge node (100) by sending, by the edge node (100), a counting request message to the plurality of UEs, wherein the counting request message requests assistance information from the UEs to aid in the distributed caching and delivery operation; and receiving, by the edge node (100), a counting response message from each of the UEs, wherein each of the counting response message comprises the assistance information associated with the UE (200).

In an embodiment, the assistance information includes at least one of a service preference of the UE (200), a mobility information of the UE (200), a quality of service (QoS) requirement of the UE (200), a battery status of the UE (200), storage capacity of the UE (200), a caching capability of the UE (200), a probability of receiving contents through a device-to-device (D2D) cluster associated with the UE (200), and a cluster information filed (CIF) indicating possible proximal communication link currently available for the UE (200), a readiness field indicating an interest of the UE (200) to offer cache and act as holder of content.

In an embodiment, the method further includes receiving, by the at least one UE (200), the at least one segment of the popular content transferred by the edge node (100) and caching, by the at least one UE (200), the at least one segment of the popular content in a cache memory of the at least one UE (200). Further, the method includes sending, by the at least one UE (200), a feedback to the edge node (100).

In an embodiment, the method includes sharing, by the at least one UE (200), the at least one segment of the popular content with other UEs in a device-to-device (D2D) cluster.

In an embodiment, the at least one UE (200) is one of a master UE of a device-to-device (D2D) cluster, a relay UE, and an isolated UE.

In an embodiment, the method further includes receiving, by the edge node (100), the feedback from each of the UEs; and measuring, by the edge node (100), a performance of the edge node (100) based on the feedback.

In an embodiment, the method includes sharing the at least one segment of the popular content with other UEs in the D2D cluster by the at least one UE. The method includes determining, by the at least one UE (200), the at least one segment of the popular content for applying a multi-hop communication in the D2D cluster; and sharing, by the at least one UE (200), the at least one segment of the popular content in the D2D cluster through the multi-hop communication.

In an embodiment, the method includes transferring, by the edge node, the at least one segment of the popular content to the at least one selected UE in the mapped delivery mode based on the scheduling. The method includes determining, by the edge node (100), the at least one segment of the popular content for applying a multi-hop communication; and transferring, by the edge node (100), the at least one segment of the popular content to the at least one selected UE in the mapped delivery mode through the multi-hop communication.

In an embodiment, the method further includes determining, by the edge node (100), a reward to the at least one UE for contributing to the distributed caching and delivery operation.

Accordingly the embodiments herein disclose a method for enabling distributed caching in a wireless network. The method includes receiving, by at least one UE (200) of a plurality of UEs, a counting request message from an edge node, wherein the counting request message requests the at least one UE (200) to aid in the distributed caching and delivery operation and sending, by the at least one UE (200), a counting response message to the edge node (100), wherein the counting response message incorporates assistance information from the UEs to aid in the distributed caching and delivery operation. The method includes receiving, by the at least one UE (200), at least one segment of a popular content from by the edge node (100); and caching, by the at least one UE (200), the at least one segment of the popular content in a cache memory of the at least one UE (200).

Accordingly the embodiments herein disclose an edge node (100) for enabling distributed caching in a wireless network. The edge node includes a memory (140) and a processor (160) coupled to the memory (140). The processor (160) is configured to receive a plurality of contents from a core network (1000) and determine popular content from the plurality of contents. Further, the processor (160) is also configured to cache the popular content in the edge node (100); and transfer at least one segment of the popular content for caching to at least one UE (200) of a plurality of UEs associated with the edge node (100).

Accordingly the embodiments herein disclose user equipment (UE) (200) for enabling distributed caching in a wireless network. The UE (200) includes a memory (240) and a processor (260) coupled to the memory (240). The processor (260) is configured to receive a counting request message from an edge node (100), wherein the counting request message requests the at least one UE to aid in the distributed caching and delivery operation and send a counting response message to the edge node (100), where the counting response message incorporates assistance information from the UEs to aid in the distributed caching and delivery operation. Further, the processor (260) is configured to receive at least one segment of a popular content from by the edge node (100); and cache the at least one segment of the popular content in a cache memory of the at least one UE (200).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

MODE FOR INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly the embodiments herein disclose a method for enabling distributed caching in a wireless network. The method includes receiving, by an edge node (100) in the wireless network, a plurality of contents from a core network (1000) and determining, by the edge node (100), popular content from the plurality of contents. Further, the method also includes caching, by the edge node (100), the popular content in the edge node and transferring, by the edge node (100), at least one segment of the popular content for caching to at least one UE (200) of a plurality of UEs associated with the edge node.

In the conventional methods and systems, the use of only unicast delivery mode for accessing social networking site contents exerts heavy pressure on the wireless networks. Unlike to the conventional methods and systems, in the proposed method both the unicast delivery mode and multicast delivery mode complement each other for the efficient resource utilization and delivery targeting new set of services.

Unlike to the conventional methods and systems, in the proposed method the best set of UEs are selected for caching contents so that it results in maximization of the service coverage and also provide most optimized resource utilization with fulfilling the constraints of different user service requirements.

Unlike to the conventional methods and systems, in the proposed method effectively utilizes synchronous broadcast communication to serve asynchronous set of user requests.

Unlike to the conventional methods and systems, in the proposed method the network gathers information about specific UE's willingness to participate in the distributed caching process and signal the selected set of UEs for caching specific contents for a determined duration.

Referring now to the drawings and more particularly to FIGS. 2 through 10B, where similar reference characters denote corresponding features consistently throughout the figure, these are shown preferred embodiments.

Figure 2:
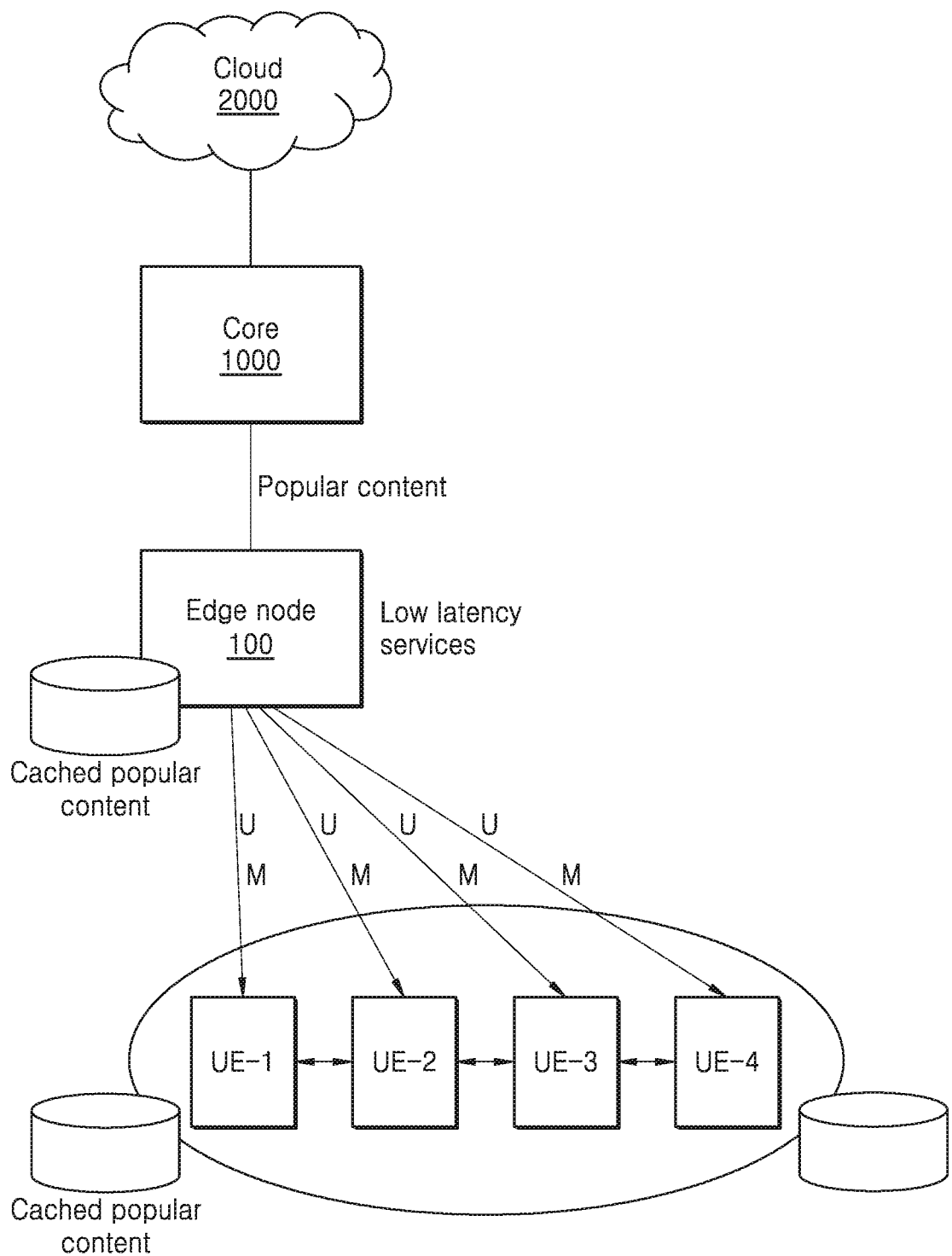
FIG. 2 illustrates a system for enabling the distributed caching in the wireless network, according to an embodiment as disclosed herein.

FIG. 2 illustrates a system for enabling distributed caching in a wireless network, according to an embodiment as disclosed herein.

Referring to the FIG. 2, the wireless network includes an edge node (100), a plurality of UEs (200a-200N), a core (1000) of the wireless network and a cloud (2000). The core (1000) of the wireless network transmits a plurality of popular content associated with low latency services such as social network to the edge node (100). The plurality of popular content associated with low latency services are generally bandwidth-intensive, asynchronously accessed, multiple object based content consumed by a plurality of users and hence transferring the plurality of popular content through a unicast delivery mode may lead to sub optimal usage of spectrum resources.

The proposed method provides caching of the plurality of popular content associated with low latency services at the edge node (100). Further, the proposed method also provides caching of the plurality of popular content at a device node/plurality of selected UEs in a local area network of devices which can communicate with each other in the transmission of popular content. Also, the proposed method allows differential treatment of the popular content while transmission. The content which are unique or dedicated to specific UE is to be sent through the unicast delivery mode and the content which is accessed by the plurality of users at a time are sent through the multicast delivery mode.

FIG. 3 illustrates a block diagram of an edge node (100) for enabling distributed caching in the wireless network, according to an embodiment as disclosed herein.

Referring to FIG. 3, the edge node (100) includes a communicator (120), a memory (140) and a processor (160).

In an embodiment, the communicator (120) is configured to receive a plurality of contents from a core network (1000). The communicator (120) is also configured to transfer the at least one segment of the popular content to the at least one selected UE (200) in the mapped delivery mode based on the scheduling. The communicator (120) is also configured to send a counting request message to the plurality of UEs and receive a counting response message from each of the UEs. The counting request message requests assistance information from the UEs to aid in the distributed caching and delivery operation and each of the counting response messages comprises the assistance information associated with the UE (200). The assistance information comprises at least one of a service preference of the UE (200), a mobility information of the UE (200), a quality of service (QoS) requirement of the UE (200), a battery status of the UE (200), storage capacity of the UE (200), a caching capability of the UE (200), a probability of receiving contents through a device-to-device (D2D) cluster associated with the UE (200), and a cluster information filed (CIF) indicating possible proximal communication link currently available for the UE (200), a readiness field indicating an interest of the UE (200) to offer cache and act as holder of content. The communicator (120) is also configured to receive the feedback from each of the UEs.

The communicator (120) is also configured to signal the at least one UE of the plurality of UEs which are selected for caching, to cache the contents sent by the edge node (100). The signaling/addressing of the at least one UE of the plurality of UEs for caching is performed on a threshold based approach for addressing the caching UEs. The threshold based addressing of the at least one UE of the plurality of UEs is performed by the edge node (100) by deriving thresholds for the selection of the UEs to perform the caching of specific contents. The selected thresholds are derived as function of a popularity of the content to provide diversity and reliability. The at least one UE of the plurality of UEs selected are signaled for performing the caching operation in the enhanced MSI (MBMS Scheduling Information) transmission. In legacy, the MSI is periodic broadcast message that carries service identities and a transmission timings of the service identities. The additional information added include a lower threshold, $L_{Thm}$ and an upper threshold, $U_{Thm}$ (i.e., a range of random numbers n sent by the UEs in a random response field of the counting procedure) for specific content m such that ($L_{Thm}$_n_$U_{Thm}$), cluster identity and holding time that the selected UEs need to retain cache. An effective cost of the signaling is negligible as the signaling is built over the existing broadcast message.

The counting request message and the counting response message are provided as exemplary signaling messages for communication across the plurality of UEs and the edge node (100). However, this does not limit to specified message name and elements and can be utilized with different alterations and variations. Triggers for the signaling messages can be synchronous e.g. periodic or asynchronous e.g.

event or condition based and can be based on usage of unicast or broadcast or other means.

In an embodiment, the memory (140) includes a cache (142). The cache (142) is configured to store the popular content from the plurality of contents received from the core network (1000). The memory (140) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (140) may, in some examples, be considered a non-transitory storage medium. The term "non-transitory" may indicate that the storage medium is not embodied in a carrier wave or a propagated signal. However, the term "non-transitory" should not be interpreted that the memory (140) is non-movable. In some examples, the memory (140) is configured to store larger amounts of information than the memory (140). In certain examples, a non-transitory storage medium may store data that can, over time, change (e.g., in Random Access Memory (RAM) or cache).

In an embodiment, the processor (160) includes a popular content determination engine (162), a segments determination engine (164), a cache management engine (166), a delivery management engine (168), a multimedia broadcast multicast service single frequency network (MBSFN) stack (170), a unicast stack (172), a user equipment (UE) management engine (174) and a scheduler (176).

In an embodiment, the popular content determination engine (162) is configured to determine popular content from the plurality of contents received from the core network (1000). In an example scenario, the popular content may be determined based on a number of access requests for the content received from the plurality of UEs. The popularity of the content is not synonymous with number of access requests for the content received from the plurality of UEs at any given instant of time. However, the popular content is correlated with the number of access requests for the content received from the plurality of UEs; and may be derived, estimated, predicted (through historical data) or foreknown (subscribed or signalled).

In an embodiment, the segments determination engine (164) is configured to split the popular content into a plurality of segments at a pre-processing stage.

In an embodiment, the cache management engine (166) is configured to cache the popular content in the edge node (100) determined by the popular content determination engine (162). The popular content is a content which is desired by a plurality of UEs. The cache management engine (166) is configured to determine the at least one cache allocation strategy based on an assistance information associated with each of the UE (200) of the plurality of UEs. The at least one cache allocation strategy is a popularity driven allocation strategy, a log function of popularity scheme driven popular allocation strategy, a power function of popularity scheme driven popular allocation strategy and a mobility driven allocation strategy. The popularity blind allocation strategy is treating all contents equally while caching the at least one segment of the popular content at UEs. The log function of popularity strategy is favoring in accordance with logarithmic function the at least one segment of the popular content with higher popularity while performing cache allocation. The power function of popularity scheme driven popularity allocation strategy is favoring in accordance with power function the at least one segment of the popular content with higher popularity while performing cache allocation. The mobility driven allocation strategy is favoring the at least one UE with higher mobility to act as content holder for performing cache allocation. Further, the cache management engine (166) is also configured to determine a cache holding threshold time associated with the at least one segment of the popular content which is cached at the edge node (100) and perform one of flush and clear the cache, in response to determining that the cache holding threshold time associated with the at least one segment of the popular content has elapsed.

In an embodiment, the delivery management engine (168) is configured to map the at least one segment from the plurality of segments to a delivery mode. The delivery mode comprises one of a broadcast delivery mode, a multicast delivery mode and a unicast delivery mode. For example, personal contents specific to a user such as user's profile pictures may be sent on unicast delivery mode and advertisement content on social networking sites may be sent on multicast delivery mode. The delivery modes also include links, carriers, beams, networks, dual-connectivity of long term evolution (LTE-LTE), LTE-Wifi, 5G-Wifi, 5G-LTE, 5G-5G, radio access techniques including 3GPP or non-3GPP based communication techniques like Wifi, Bluetooth, WAN etc. In another embodiment, device to device communication can take any of the access mechanism based on 3GPP like D2D, PC5, NB-MT, Re110/13 Relay, L1/L2/L3 based relay or non-3GPP techniques like Wifi, Bluetooth or any other short range communication.

In another embodiment, the delivery management engine (168) may map the at least one segment from the plurality of segments of the popular content completely to the broadcast delivery mode for better resource utilization and cost efficient.

In another embodiment, content is partly or fully offload to broadcast delivery mode.

In another embodiment of the invention, initial spreading or cache building step which involves caching of the contents at the selected UEs in the wireless network is performed using multicast/broadcast techniques like MBMS. This ensures one shot communication of the all the cacheable contents.

In another embodiment, the signaling/addressing message uses explicit UE identification (UE ID) to address the at least one UE of the plurality of UEs which need to perform the caching. The at least one UE of the plurality of UEs with matching UE IDs perform the caching operation whereas the other UEs of the plurality of UEs ignore the signaling/addressing message.

In an embodiment, the MBSFN stack (170) is configured to store the at least one segment from the plurality of segments which will be transferred in one of the broadcast delivery mode and the multicast delivery mode.

In an embodiment, the unicast stack (172) is configured to store the at least one segment from the plurality of segments which will be transferred in one of the unicast delivery mode.

In an embodiment, the UE management engine (174) is configured to select the at least one UE (200) form the plurality of UEs to act as content holders for caching based on the at least one cache allocation strategy, the assistance information associated with each of the UE of the plurality of UEs, a popularity of the at least one segment of the popular content, a D2D cluster, a group of the at least one segment of the popular content, UEs capability of performing multi-hop communication and mobility of the at least one UE of the plurality of UEs. The process of determining the at least one UE (200) form the plurality of UEs to act as content holders for caching is explained in detail in the FIGS. 8A-8B.

Further, the UE management engine (174) is also configured to determine at least one of a reward and an incentive to the at least one UE (200) for contributing to the distributed caching and delivery, operation. The at least one of the reward and the incentive may be related to billing concessions, priority treatment, privileges etc.

In an embodiment, the scheduler (176) is configured to jointly schedule a delivery of the at least one segment of the popular content for caching at the at least one selected UE (200) over a composite 5G channel.

Although the FIG. 3 shows the hardware elements of the edge node (100) but it is to be understood that other embodiments are not limited thereon. In other embodiments, the edge node (100) may include less or more number of elements. Further, the labels or names of the elements are used only for illustrative purpose and does not limit the scope of the invention. One or more components can be combined together to perform same or substantially similar function.

FIG. 4 illustrates a block diagram of the UE (200) for enabling distributed caching in the wireless network, according to an embodiment as disclosed herein.

Referring to FIG. 4, the UE (200) is one of a master UE of a device-to-device (D2D) cluster, a relay UE, and an isolated UE. The UE (200) includes a communicator (220), a memory (240) and a processor (260).

In an embodiment, the communicator (220) is configured to receive the counting request message from the edge node (100) and send the counting response message to the edge node (100). The counting request message requests the at least one UE to aid in the distributed caching and delivery operation and the counting response message incorporates assistance information from the at least one UE to aid in the distributed caching and delivery operation.

The communicator (220) is configured to receive the at least one segment of the popular content sent from by the edge node (100).

The communicator (220) is also configured to send one of a device advertisement and a service advertisement in the D2D clusters indicating an availability of the at least one segment of the popular content, services which are cached at the UE (200). Further, the communicator (220) is configured to receive at least one solicitation message sent by the at least one other UE in the D2D cluster requesting for the at least one segment of the popular content which are cached at the UE (200) and share a response message with the at least one other UE in the D2D cluster with caching information incorporated in the message along with the at least one segment of the popular content requested by the at least one other UE in the D2D cluster. Therefore, the UE (200) uses the solicitation message to discover the at least one other UE from the plurality of UEs within the D2D cluster which can act as holders of content for enabling distributed caching. The communicator (220) is also configured to receive the signaling/addressing from the edge node (100) for performing the caching based on the threshold based approach for addressing the caching UEs.

In an embodiment, the memory (240) includes a cache (242). The cache (242) is configured to store the at least one segment of the popular content transferred by the edge node (100). The memory (240) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (240) may, in some examples, be considered a non-transitory storage medium. The term "non-transitory" may indicate that the storage medium is not embodied in a carrier wave or a propagated signal. However, the term "non-transitory" should not be interpreted that the memory (240) is non-movable. In some examples, the memory (240) is configured to store larger amounts of information than the memory (240). In certain examples, a non-transitory storage medium may store data that can, over time, change (e.g., in Random Access Memory (RAM) or cache).

In an embodiment, the processor (260) includes an application and middle ware (262), a cache management engine (264), a service-level merge engine (266), a unicast stack (268) and a MBSFN stack (270).

In an embodiment, the application and middle ware (262) is configured to determine the assistance information associated with the UE (200), in response to receiving the counting request message from the edge node (100). Further, the application and middle ware (262) is configured to incorporate the assistance information associated with the UE (200) in the counting response message.

In an embodiment, the cache management engine (264) is configured to cache the at least one segment of the popular content in the cache memory (242) of the at least one UE (200). In another embodiment, the at least one UE (200) can initiate the distributed caching by generating an uplink/reverse traffic. Further, the cache management engine (264) may send the plurality of contents over multiple links/paths which need to be cached at the edge node (100) for further delivery to the D2D clusters and/or to contents server. Further, the cache management engine (264) is also configured to determine the cache holding threshold time associated with the at least one segment of the popular content which is cached at the UE (200) and perform one of flush and clear the cache, in response to determining that the cache holding threshold time associated with the at least one segment of the popular content has elapsed.

In another embodiment, consider that the UE (200) is a master UE in the D2D cluster, then the cache management engine (264) is configured to discover the at least one UE from the plurality of UEs within the D2D cluster which can act as holders of content for enabling distributed caching based on the solicitation message received from the at least one other UE in the D2D cluster. Also, the cache management engine (264) is configured to determine the plurality of contents in one of vicinity of the master UE and within the D2D cluster which can be used for distribution over the D2D cluster using a D2D link. Further, the cache management engine (264) is configured to share the at least one segment of the popular content in a multi-hop communication mode to ensure larger spread and also achieve a higher level of distributed caching in the D2D cluster. In one embodiment of the invention, cache management engine (264) applies or enables multi-hop communication selectively for the low-latency services.

In an embodiment, the service-level merge engine (266) is configured to merge the at least one segment of the popular content received from the edge node (100) in the plurality of delivery modes at a post-processing stage. Further, the in case the UE (200) is the master UE (200) of the device-to-device (D2D) cluster, then the UE (200) is configured to send the merged at least one segment of the popular content to the plurality of UEs in the D2D cluster. Also, in case the UE (200) is the relay UE, then the UE (200) is configured to send the merged at least one segment of the popular content to the plurality of UEs which are located in an out of coverage area of the edge node (100).

In an embodiment, the unicast stack (268) is configured to store the at least one segment of a popular content received from the edge node (100) in the unicast delivery mode.

In an embodiment, the MBSFN stack (270) is configured to store the at least one segment of the popular content received from the edge node (100) in one of the broadcast delivery mode and the multicast delivery mode.

Although the FIG. 4 shows the hardware elements of the UE (200) but it is to be understood that other embodiments are not limited thereon. In other embodiments, the UE (200) may include less or more number of elements. Further, the labels or names of the elements are used only for illustrative purpose and does not limit the scope of the invention. One or more components can be combined together to perform same or substantially similar function.

FIG. 5 illustrates a flow diagram 300 of a method for enabling distributed caching in the wireless network by the edge node (100), according to an embodiment as disclosed herein.

Referring to the FIG. 5, at step 302, the edge node (100) receives the plurality of contents from the core network (1000). For example, in the edge node (100) as illustrated in the FIG. 3, the processor (160) can be configured to receive the plurality of contents from the core network (1000).

At step 304, the edge node (100) determines the popular content from the plurality of contents. For example, in the edge node (100) as illustrated in the FIG. 3, the processor (160) can be configured to determine the popular content from the plurality of contents.

At step 306, the edge node (100) caches the popular content in the edge node (100). For example, in the edge node (100) as illustrated in the FIG. 3, the processor (160) can be configured to cache the popular content in the edge node (100).

At step 308, the edge node (100) splits the popular content into the plurality of segments. For example, in the edge node (100) as illustrated in the FIG. 3, the processor (160) can be configured to split the popular content into the plurality of segments.

At step 310, the edge node (100) maps the at least one segment from the plurality of segments to the delivery mode. For example, in the edge node (100) as illustrated in the FIG. 3, the processor (160) can be configured to map the at least one segment from the plurality of segments to the delivery mode of the plurality of delivery modes.

At step 312, the edge node (100) determines the at least one cache allocation strategy based on an assistance information associated with each of the UE (200) of the plurality of UEs. For example, in the edge node (100) as illustrated in the FIG. 3, the processor (160) can be configured to determine the at least one cache allocation strategy based on a assistance information associated with each of the UE (200) of the plurality of UEs.

At step 314, the edge node (100) selects the at least one UE (200) from the plurality of UEs to act as content holders for caching based on the at least one cache allocation strategy. For example, in the edge node (100) as illustrated in the FIG. 3, the processor (160) can be configured to select the at least one UE (200) from the plurality of UEs to act as content holders for caching based on the at least one cache allocation strategy.

At step 316, the edge node (100) schedules the delivery of the at least one segment of the popular content for caching at the at least one selected UE (200). For example, in the edge node (100) as illustrated in the FIG. 3, the processor (160) can be configured to schedule the delivery of the at least one segment of the popular content for caching at the at least one selected UE (200).

At step 318, the edge node (100) transfers the at least one segment of the popular content to the at least one selected UE (200) in the mapped delivery mode based on the scheduling. For example, in the edge node (100) as illustrated in the FIG. 3, the processor (160) can be configured to transfer the at least one segment of the popular content to the at least one selected UE (200) in the mapped delivery mode based on the scheduling.

At step 320, the edge node (100) receives the feedback from each of the UEs (200). For example, in the edge node (100) as illustrated in the FIG. 3, the processor (160) can be configured to receive the feedback from each of the UEs (200).

At step 322, the edge node (100) measures the performance of the edge node (100) based on the feedback. For example, in the edge node (100) as illustrated in the FIG. 3, the processor (160) can be configured to measure the performance of the edge node (100) based on the feedback.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

FIG. 6 illustrates a flow diagram 400 of a method for enabling distributed caching in the wireless network by the UE (200), according to an embodiment as disclosed herein.

Referring to the FIG. 6, at step 402, the UE (200) receives the counting request message from the edge node (100), where the counting request message requests the at least one UE (200) to aid in the distributed caching and delivery operation. For example, in the UE (200) as illustrated in the FIG. 4, the processor (260) can be configured to receive the counting request message from the edge node (100), where the counting request message requests the at least one UE (200) to aid in the distributed caching and delivery operation.

At step 404, the UE (200) sends the counting response message to the edge node (100), where the counting response message incorporates assistance information from the UEs to aid in the distributed caching and delivery operation. For example, in the UE (200) as illustrated in the FIG. 4, the processor (260) can be configured to send the counting response message to the edge node (100), where the counting response message incorporates assistance information from the UEs to aid in the distributed caching and delivery operation.

At step 406, the UE (200) receives the at least one segment of the popular content from by the edge node (100). For example, in the UE (200) as illustrated in the FIG. 4, the processor (260) can be configured to receive the at least one segment of the popular content from by the edge node (100).

At step 408, the UE (200) caches the at least one segment of the popular content in the cache memory of the at least one UE (200). For example, in the UE (200) as illustrated in the FIG. 4, the processor (260) can be configured to cache the at least one segment of the popular content in the cache memory of the at least one UE (200).

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

FIG. 7 illustrates a service level multi-connectivity provided by the proposed method in the wireless communication network, according to an embodiment as disclosed herein.

Referring to the FIG. 7, the service level multi-connectivity refers to the differential treatment of the popular content by selecting a suitable delivery mode which will enable better service delivery and utilization of the resources.

A joint scheduling of physical resources is provided by the proposed method using both the unicast delivery mode and the multicast delivery mode over the composite 5G channel. The at least one segment of the popular content which is dedicated and consumed by targeted users only is sent over the unicast delivery mode. The at least one segment of the popular content which is consumed by the plurality of users is sent over the multicast delivery mode. Further, the splitting of the at least one segment of the popular content is performed at the edge node (100) at the pre-processing stage of the content delivery mechanism. Further, on the UE (200) side, the at least one segment of the popular content received over the unicast delivery mode and the multicast delivery mode is merged at the post-processing stage of the content delivery mechanism.

Figure 8A:
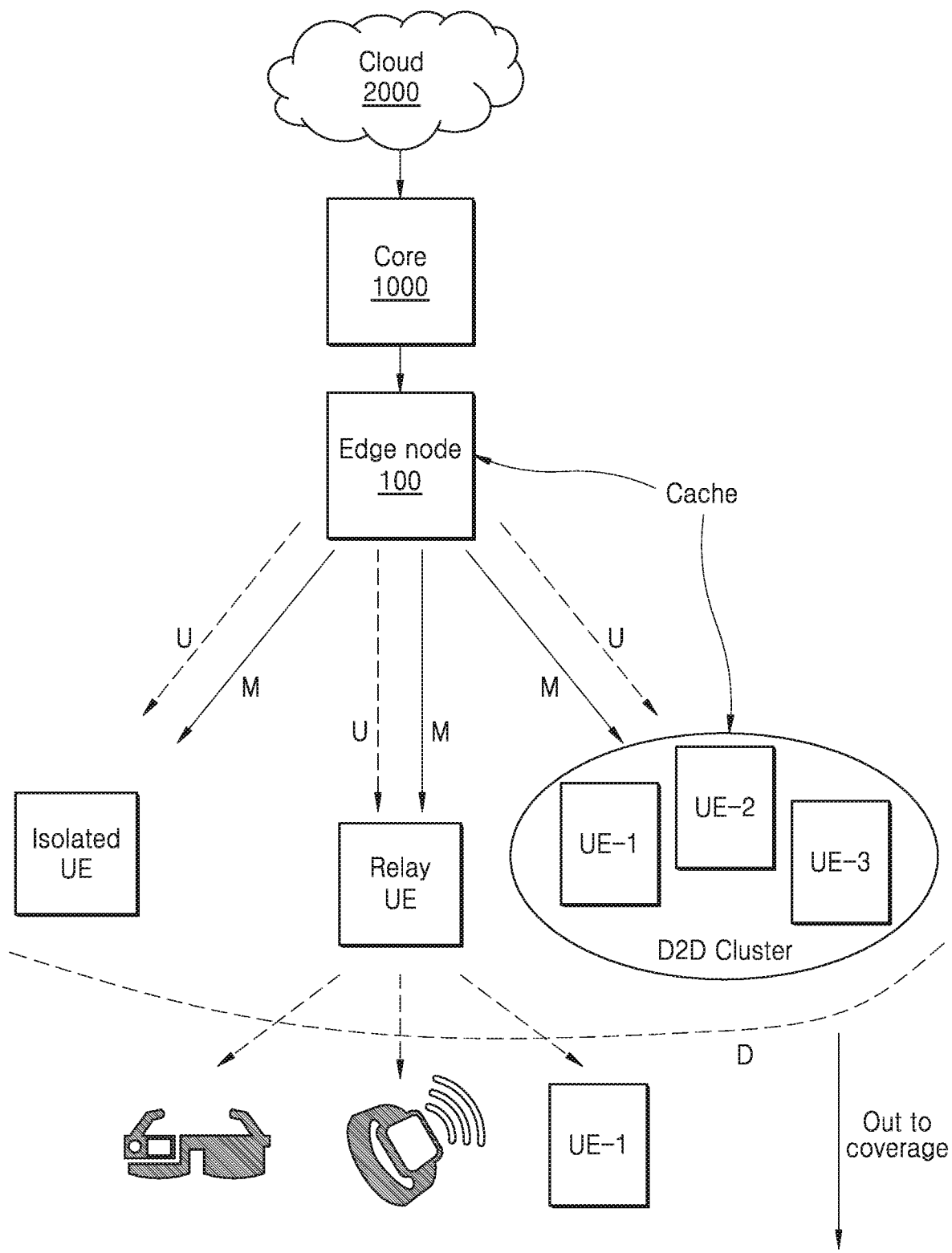
FIG. 8A illustrates a unified service delivery system for providing distributed caching by the edge node (100) and the at least one UE (200) in the wireless communication network, according to an embodiment as disclosed herein.

FIG. 8A illustrates a unified service delivery system for providing distributed caching by the edge node (100) and the at least one UE (200) in the wireless communication network, according to an embodiment as disclosed herein.

Referring to the FIG. 8, the unified service delivery system includes the D2D clusters which include the plurality of UEs which are connected in the form of a network and can communicate with each other. Further, the D2D clusters are also connected to the edge node (100) and hence the proposed method enables caching of the popular contents at the edge node (100) as well as at the D2D clusters. The plurality of UEs in the D2D clusters can then share the cached popular content with the other UEs in the D2D cluster.

The unified service delivery framework also includes the relay UE (200) which is capable of communicating with the plurality of UEs which are not within the range of the edge node (100) and hence are located in the out-of-coverage area. The proposed method enables caching of the popular contents at the edge node (100) as well as at the relay UE (200). The relay UE (200) can then send the cached popular content to the plurality of UEs which are not within the range of the edge node (100).

The unified service delivery framework also includes the isolated UE (200) which is standalone and hence the proposed method enables caching of the popular contents at the edge node (100) as well as at the isolated UE (200).

A table. 1 provides descriptions related to the various parameters used in the proposed method for enabling distributed cache:

TABLE 1

| Symbol | Description |
|---|---|
| $\lambda_{iR}$ | UE content access request rate |
| $\lambda_{ij}$ | Contact rate between at least two UEs of the plurality of UEs |
| α | Content popularity profile |
| $b_m$ | Size of the content |
| $n_l$ | Number of UEs in cluster l |
| $C_{D2D}$ | Cost of receiving contents through D2D |
| $P_{D2D}$ | Probability of receiving contents through D2D |
| $C_{RAN}$ | Cost of receiving contents through RAN |

TABLE 1-continued

| Symbol | Description |
|---|---|
| $n_m$ | Number of UEs caching the at least one segment of the popular content m |
| $t_m$ | Caching holding time for the at least one segment of the popular content m |
| M | Number of cached contents |
| A | Availability matrix of UEs N and contents M |
| $C_{broad}$ | Broadcast resource cost |
| $C_{store}$ | Storage cost in proximal network |
| $C_{distr}$ | Distribution resource cost through D2D links |
| μ | Broadcast cost normalization weight factor |
| β | Storage cost normalization weight factor |
| γ | D2D cost normalization weight factor |
| ζ | Normalization factor for RAN resource cost |

Consider the wireless communication network as shown in the FIG. 8 includes 'N' plurality of UEs with (n∈N) spread across forming 'L' D2D clusters. Geographically, the D2D cluster L1 (1≤l≤L) is defined as a set of in-coverage UEs nl which are in proximity to each other at a distance d where (d≤d1, cluster range). However, the mobility dynamics of the plurality of UEs leads to change in the distribution of the plurality of UEs with time. As a result, a UE pair {i, j} within the D2D cluster communicates only when the two UEs come in proximity to each other and in other cases the plurality of UEs communicate with each other through the edge node (100). The at least two UEs are in contact with each other i.e., during the "contact times" tc between the at least two UEs with contact rate αij such that tc~exp (αij)

Further, the FIG. 8A also describes about the multi-hop communication where the at least one segment of the popular content passes through the plurality of UEs (due to multi-hop) before reaching a destination UE in the D2D cluster.

Consider a service such as for example a social networking service which includes the plurality of contents represented as set C. The set C also includes plurality of segments, packets etc of the popular content. Therefore, C={c1,c2, . . . } where C∈S, where S is the service set.

The plurality of segments of the contents in the set C may be classified based on various features of the plurality of segments such as popularity, latency, content size, real or no-real time nature etc. Therefore, based on the features of the plurality of segments, the plurality of segments may be treated differently in the wireless network. Further, the at least one UE accesses different segments of the plurality of segments at different points of time which is represented using an exponential distribution for the plurality of segments access request times $t_r$ for each UE i with a request rate $\lambda_{iR}$ such that for example $t_r$~exp($\lambda_{iR}$).

Further, consider that in an example the Zipf (Discrete-Pareto) distribution is used to determine a popularity of the plurality of segments of the popular content by the edge node (100). Consider the edge node (100) includes the cache (142) to hold M popular contents out of a library of F files stored at the cloud (2000). The size of each of the M popular contents is bm bytes where (1M). Then the popularity of the mth content file is determined as $$P_m = \frac{m^{-\alpha}}{\sum_{(h=1)}^{M} f^{-\alpha}} \quad (1)$$

where α is an exponent value characterizing the Zipf distribution and f is a variable for summation.

Further, the overall cost of the reception of the plurality of segments of the popular content at the D2D cluster nodes is determined by the edge node (100) as:

$$C_{D2D}=\mu\Sigma_{(m=1)}^{M}b_m+\beta\Sigma_{(m=1)}^{M}n_m b_m t_m+\gamma\Sigma_{(l=1)}^{L}n_l\Sigma_{(m=1)}^{M}b_m P_{D2D} \quad (2)$$

where the first term indicates the multicast cost of reception, the second term indicates the cost of storing/caching and the third term indicates the cost of distribution to the plurality of UEs within the D2D cluster.

Further, the edge node (100) determines the interaction of access requests from the plurality of UEs in the D2D cluster and the contact time of the plurality of UEs in the wireless communication network within the cache holding threshold time, T. Further, based on the interaction of access requests from the plurality of UEs and the contact time of the plurality of UEs within the cache holding threshold time, the edge node (100) determines the probability of the reception of the plurality of segments of the popular content at the D2D cluster as $$P_{D2D}=\int_0^T \Sigma_{(i=1)}^{N}\Sigma_{(j=1)}^{N}\lambda_{ij}e^{-(\lambda_i R_i+\Sigma_{(j=1)}^{N}\lambda_{ij})t}s.t. j\in N_r, j\cdot i? \quad (3)$$

Further, once the cache holding threshold time, T the edge node (100) performs one of flushes and clears the cache and subsequently the cache building of a new set of the at least one segment of the popular content is performed by the edge node (100) and the at least one UE of the plurality of UEs.

In another embodiment, the plurality of segments of the popular content may be received directly from the RAN and the cost of receiving the plurality of segments of the popular content through RAN is:

$$C_{RAN}=\eta\Sigma_{(l=1)}^{L}n_l\Sigma_{(m=1)}^{M}b_m(1-P_{D2D}) \quad (4)$$

Further, using the N UEs in the D2D cluster and the M popular contents an availability matrix of the plurality of UEs is determined as using existing mechanism as:

$$A = \begin{bmatrix} a_{1,1} & \cdots & & & \cdots & a_{1,M} \\ \cdots & \cdots & a_{i,m} & \cdots & \cdots \\ \cdots & \cdots & \cdots & \cdots & \cdots \\ a_{N,1} & \cdots & & & \cdots & a_{N,M} \end{bmatrix} \quad (5)$$

However, the matrix A includes a very large number of UEs and hence needs to be compressed before enabling the distributed caching by the edge node (100). The compressed form of the matrix A will provide the total number of UEs which will act as content holders for distributed caching.

The matrix A is compressed for the selection of the UEs which will act as content holders for distributed caching using the plurality of parameters such as at least one cache allocation strategy, the assistance information associated with each of the UE of the plurality of UEs, a popularity of the at least one segment of the popular content, a D2D cluster, a group of the at least one segment of the popular content. The assistance information associated with each of the UE of the plurality of UEs includes at least one of the service preference of the UE (such as for example social networking service, emergency service, etc), the mobility information of the UE (such as for example low mobility, high mobility and medium mobility), the QoS requirement of the UE, the battery status of the UE, the signal conditions at the UE, the storage capacity of the UE, the caching capability of the UE, the probability of receiving contents through the device-to-device (D2D) cluster associated with the UE, and the cluster information filed (CIF) indicating possible proximal communication link currently available for the UE, the readiness field indicating an interest/consent/authorization of the UE to offer cache and act as holder of content. The readiness of the UE to perform the caching is dependent on a multitude of factors like battery status, storage availability, signal conditions or requiring same set of contents for its own use, bandwidth and suitable access technology, billing factors etc.

In the proposed distributed caching method, the matrix A is compressed at two stages by the edge node (100) i.e., a first stage for UE screening and a second stage for content screening. In the first stage, the edge node (100) determines the plurality of UEs which belong to the same D2D cluster based on the CIF field of the counting response message received from each of the UEs and groups the UEs belonging to the same D2D cluster. The CIF field indicates the proximal communication link available to the UE in real-time. Further, the edge node (100) groups the at least one segment of the popular content based on popularity to diversify the availability of the at least one segment of the popular content in the D2D cluster. Also, the one segment of the popular content which are grouped are distributed and stored at different UEs. Furthermore, the edge node (100) determines compresses the matrix A based on the readiness factor indicated by the RF field of the counting response message received from each of the UEs. Then the at least one UE (Nr∈N) of the plurality of UEs are screened for providing distribute caching.

From the equation (3), the probability of the reception of the plurality of segments of the popular content at the D2D cluster $P_{D2D}$ is dependent on content popularity (related to am), the mobility (related to $\alpha_{ij}$) and the cache holding period (T) of the at least one UE of the plurality of UEs.

In the second stage, the edge node (100) determines the n m with respect to the popularity of content m to confirm the availability of the at least one segment of the popular content with higher popularity in the D2D clusters. The popularity of the at least one segment of the popular content is based on the access request density for specific content. Further, based on the equation (3), the cache holding period T is dependent on the plurality of factors such as for example a popularity decline profile of the service, a latency requirement of service, a load balancing based on the available caching space available with the plurality of UEs in the wireless communication network, etc. Based on the equation (2) and the equation (3), the cache holding period T and n m are inter-dependent and hence can be addressed by tuning both the cache holding period T and $n_m$ based on the restrictions for latency and storage.

The at least one cache allocation strategy based on the popularity of the content includes one of the popularity blind allocation strategy, the log function of popularity scheme driven popular allocation strategy, the power function of popularity scheme driven popularity allocation strategy and the mobility driven allocation strategy.

The popularity blind allocation strategy includes caching the at least one segment of the popular content at more number of UEs and treating each segment of the service and/or each of the services equally while determining the content for caching. The popularity blind allocation strategy is determined based on:

$$n_m = \frac{N_r}{M} \quad (6)$$

The log function of the popularity driven popular allocation strategy includes favoring the at least one segment of the popular content with higher popularity while performing cache allocation, which is indicated as:

$$n_m \propto \log\left(\frac{m^{-\alpha}}{\Sigma_{(h=1)}^M h^{-\alpha}}\right) \quad (7)$$

The power function of popularity scheme driven popularity allocation strategy is indicated as:

$$n_m \propto \left(\frac{m^{-\alpha}}{\Sigma_{(h=1)}^M h^{-\alpha}}\right)^k \quad \text{s.t.} \ 0 \leq k \leq 1 \quad (8)$$

In general, the at least one segment of the popular content associated with the low latency services such as the social networking services may be one of delay tolerant and delay sensitive and also includes a plurality of packets. In case of the at least one segment of the popular content which are delay sensitive, the edge node (100) determines some specific QoS constraints with respect to at least one of latency and access delay has to be fulfilled i.e. $T \leq T_{m(thqos)}$. Further, if the $T \leq T_{m(thqos)}$ threshold is breached, then the packets of the at least one segment received from the edge node (100) will increase the resource cost and overshoots the QoS bounds. Further, an alternate would be a margin of time, a, is deducted from the expected D2D latency $(T_{m(thqos)} - \delta)$ to allow a fallback to the edge node (100) within the QoS bounds. Therefore, the edge node (100) has to maximize the $P_{D2Dm_{(thqos)}}$ and the probability of the reception of the at least one segment of the popular content through the D2D cluster within the $T_{m(thqos)}$, which is obtained as:

$$P_{D2Dm_{(ik_m)}} = \int_0^T \Sigma_{(i=1)}^N \Sigma_{(j=1)}^N \lambda_{ij} e^{-(\lambda_8 + \Sigma_{(j=1)}^N \lambda_{ij})t} dt \ \text{s.t.} \ j \in n_{ms} j \neq i, \quad (9)$$

$$\forall \ I: \ni \lambda_{iR(m)} > 0.$$

In case of the at least one segment of the popular content which are delay tolerant, the edge node (100) determines an upper limit $T_{m(th)}$ on the caching based on the storage limitation:

$$C_{store} = \beta l \Sigma_{(m=1)}^M n_m b_m t_m$$

of the wireless network requiring at least one of the cache to be cleared-up for the new set of the at least one segment of the popular contents, popularity decline of the at least one segment of the popular contents with time which will reduce the utility of the distributed caching.

Further, the proposed distributed caching provides multi-hop communication for low latency QoS services to provide faster delivery of the at least one segment of the popular content.

The contact times between the destination UE i and the at least one UE of the plurality of UEs acting as content holders are exponentially distributed with rate $\alpha_{ij}$ determines a minimum time required for the transfer of the at least one segment of the popular contents. The probability density function (PDF) of the content transfer time is extended over the H multi-hops to obtain $f_{t(mutihop)}$ as:

$$f_{t(multihop)} = [\Pi_{(x=1)}^H \xi_x] \Sigma_{(y=1)}^H \frac{e^{-\xi t}}{\Pi_{(z \neq y, z=1)}^H (\xi_z - \xi_y)} \quad (10)$$

where a single subscript random variable is represented as $\xi_x = (\Sigma_{(j=1)}^N \lambda_{ij})$ s.t. x,y,z ∈ H, j≠i and j is the cache holder UE at the beginning of each hop of the multi-hop. Further, the number of UEs acting as content holders is incremented with every hop of the content transfer.

Further, the exponential distribution of contact times between each pair of the UEs for each hop of communication, the PDF of the content transfer-time over the multi-hops $f_{t(multihop)}$ is determined as a summation of the independent exponentials in the equation (10).

Further, the probability of the D2D transfer of the at least one segment of the popular content m through P feasible paths of different multi-hops to the destination UE within the threshold time $T_{m(th)}$ is $P_{D2Dm(multihop)}$ is:

$$P_{D2D_{m(multihop)}} = \Sigma_0^P P_{D2D_{m(th)}} * \int_0^{T_{m(th)}} f_{t(multihop)} dt \quad (11)$$

As the popularity driven allocation strategy provides for caching of the popular contents at more number of UEs, the introduction of the multi-hop communication further boosts the effect with increased transfer and caching of the at least one segment of the popular content.

FIG. 8B illustrates a Markov chain for UE mobility state used in mobility driven allocation strategy at the edge node (100) of the wireless network, according to an embodiment as disclosed herein.

Referring to the FIG. 8B, indicates the probability of movement of the at least one UE from one mobility state to the other mobility state as shown in the Markov chain for UE mobility state.

Referring to the equation (3) and the equation (4), the cost of receiving the plurality of segments of the popular content through the RAN i.e., the CRAM can be reduced further with increased interaction possibilities when the high mobility UEs are selected to act as the content holders for the distributed caching. The plurality of UEs may determine and send the mobility state based on existing methods such as a rate of change of the D2D cluster, a signal strength variation, a proximity measurement, location information like global positioning system (GPS), an observed time difference of arrival (OTDOA) technique etc. The mobility state of the UE is indicated in the MF field of the assistance information sent as part of the counting response message by the plurality of UEs to the edge node (100). The plurality of UEs is classified as low mobility UEs, medium mobility UEs and high mobility UEs by the edge node (100). The three-state Markov chain represents low mobility state, medium mobility state and high mobility state of the UEs and a specific set of transition probabilities across the Markov states as shown in the FIG. 8B. Therefore, the edge node (100) is entitled to configure the mobility factor while performing the distributed caching using the at least one UE of the plurality of UEs.

Figure 9:
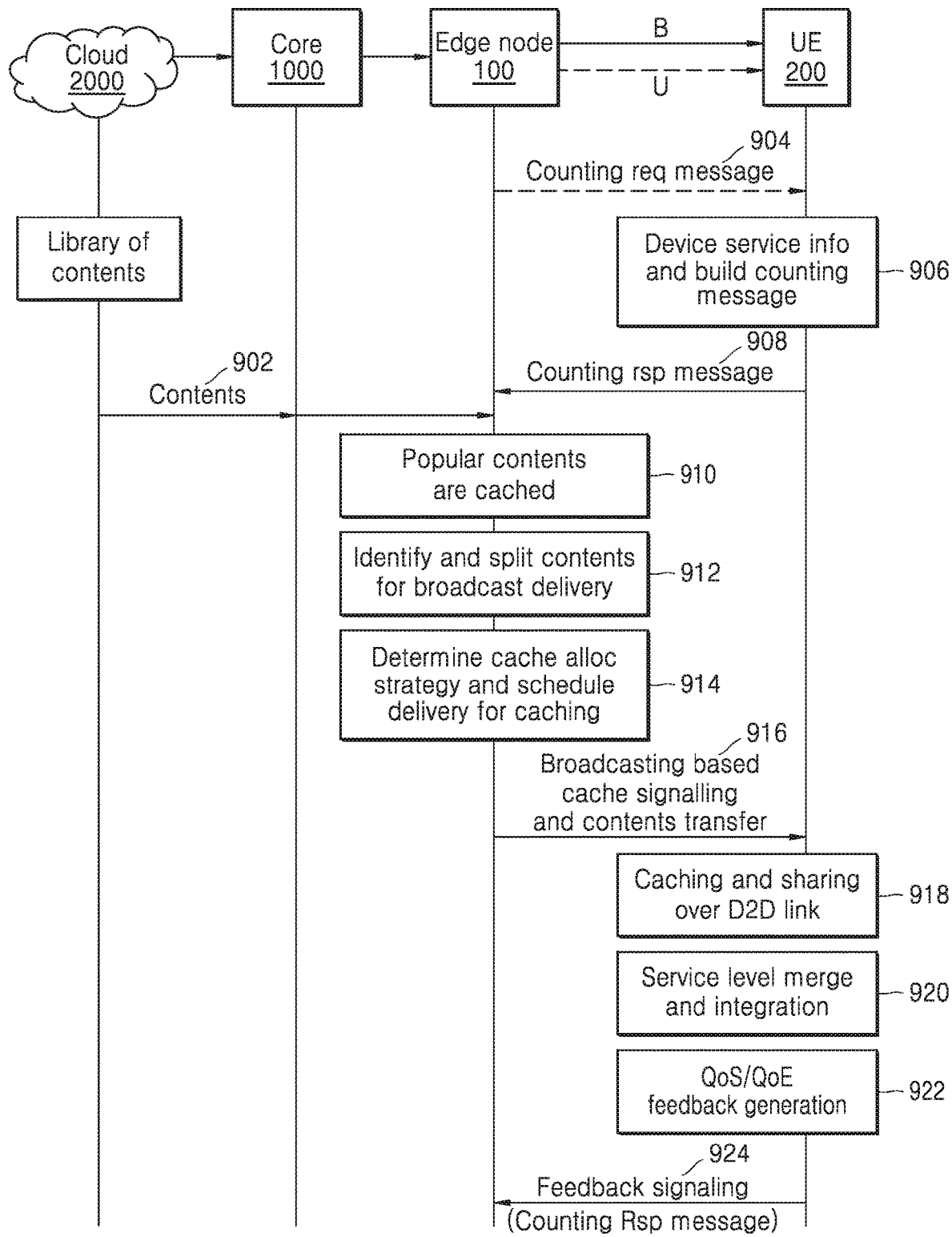
FIG. 9 is a signaling diagram illustrating the method for enabling the distributed caching at the edge node (100) and the at least one UE (200) of the plurality of UEs of the wireless communication network, according to an embodiment as disclosed herein.

FIG. 9 is a signaling diagram illustrating the method for enabling distributed caching at the edge node (100) and the at least one UE (200) of the plurality of UEs of the wireless communication network, according to an embodiment as disclosed herein.

Referring to the FIG. 9, at step 902, the cloud (2000) server of the wireless communication network transmits the plurality of content to the core (1000) which in turn transmits the plurality of content to the edge node (100).

At step 904, the edge node (100) sends the counting request message to the plurality of UEs requesting the at least one UE (200) of the plurality of UEs to aid in the distributed caching and delivery operation by sharing the assistance information. The counting request message includes a service list with respect to which the at least one UE (200) of the plurality of UEs need to send the assistance information to the edge node (100).

At step 906, the at least one UE (200) of the plurality of UEs determines the device service information and incorporates the assistance information from the UEs to aid in the distributed caching and delivery operation. Further, at step 908, the at least one UE (200) of the plurality of UEs sends the counting response message to the edge node (100).

At step 910, the edge node (100) caches the popular content received from the core (1000) at the edge node (100).

At step 912, the edge node (100) splits the popular content into the plurality of segments. Further, the edge node (100) also identifies the delivery mode for the transmission of the plurality of segments.

At step 914, the edge node (100) determines the at least one cache allocation strategy based on the assistance information associated with each of the UE (200) of the plurality of UEs and selects the at least one UE (200) form the plurality of UEs to act as content holders for caching based on the at least one cache allocation strategy. Further, the edge node (100) schedules the delivery of the plurality of segments in the determined delivery mode.

In another embodiment, the edge node (100) selects the cache allocation strategy based on an operating region (such as for example a popularity profile and range) to achieve maximum performance in terms of resource utilization, latency, etc whichever is required.

At step 916, the edge node (100) broadcasts a cache signaling message to the at least one UE of the plurality of UEs which is selected for caching the plurality of segments of the popular content at the UE end.

At step 918, the at least one UE (200) receives the plurality of segments of the popular content to be cached and stores the same in the cache (242) of the at least one UE (200). Further, the at least one UE (200) also shares the plurality of segments of the popular content with the other UEs in the D2D cluster.

At step 920, the at least one UE (200) merges the plurality of segments of the popular content at the post-processing stage of the proposed method.

At step 922, the at least one UE (200) determines the quality of the plurality of segments of the popular content and generates a quality of service (QoS)/quality of experience (QoE) feedback based on the feedback received from the plurality of users.

At step 924, the at least one UE (200) sends the (QoS)/(QoE) feedback to the edge node (100) in the counting response message. The (QoS)/(QoE) feedback comprises parameters associated with at least one of assessment, performance, quality, a latency, a delay involved, the QoS targets, the Quality of Experience (QoE) targets, the radio resource cost etc. The (QoS)/(QoE) feedback is used by the edge node (100) to improve the quality of the services provided with the distributed caching.

FIG. 10A is a graph illustrating a comparison of a RAN resource cost with respect to the plurality of cache allocation strategy at the edge node (100) in the wireless network, according to an embodiment as disclosed herein.

Referring to the FIGS. 10A-10G includes simulation results for the method for enabling distributed caching. Consider the number of segments of the plurality of popular contents to be 20 and the plurality of UEs is in a range of 100 to 300. The popularity of the content is determined using an existing mechanism such as for example, the Discrete Pareto (Zipf) distribution technique. The state of mobility of the plurality of UEs is assigned using the probabilistic three-state Markov chain and includes one of the low mobility state, the medium mobility state and the high mobility state at each point of time as shown in the FIG. 8B. Further, each UE pair $\{i, j\}$ has the contact rate $\alpha ij$ which is exponentially distributed. There are 4 clusters used in the simulation and at least one UE of the plurality of UEs may be part of the cluster and the remaining UEs of the plurality of UEs may be located outside the cluster at a given point of time. The at least one UE of the plurality of UEs which is part of the cluster is capable of exchanging the data freely when a first UE of the plurality of UEs comes in contact with other a second UE of the plurality of UEs in the cluster holding the required cached at least one segment of the plurality of popular content. However, due to mobility dynamics, the at least one UE of the plurality of UEs moves across clusters and hence ensures greater distribution of the cached at least one segment of the plurality of popular contents. Further consider that the edge node (100) caches the at least one segment of the plurality of popular content only at specific number of UEs of the plurality of UEs, which further distributes the at least one segment of the plurality of popular content. The edge node (100) ensures that the same segment of the popular content is not cached at all the UEs and provides diversified segments of the popular content ensuring the availability of the desired contents at cluster level.

Consider the below parameters for FIGS. 10A-10G in table. 2.

TABLE 2

| Parameter | Value |
| --- | --- |
| No. of UEs in wireless network | 100-300 |
| No. of popular contents | 20 |
| No. of D2D clusters | 4 |
| UE content access request rate, $\lambda_{IR}$ | 0.05 |
| Contact rate between two UEs, $\lambda_{ij}$ | 0.05-0.25 |
| Content popularity profile, a | 0-5 |
| Content size, $b_m$ | 500 KB |
| Cache storage at UE | 1M |
| Latency period, T | 500 ms |

Referring to the FIG. 10A, the graph is a plot of a radio access network (RAN) resource cost (Kbytes) on Y-axis Vs the content popularity profiles of the plurality of cache allocation strategy on X-axis. The graph indicates the proportion of the at least one segment of the popular content which is more popular.

The value of 3.5 on the X-axis indicates that some of the at least one segments of the popular content are extremely popular. In case the value on the X-axis is at 0, then the popularity of all the segments of the popular content are treated equally. Therefore, as indicated in the FIG. 10A, the log function of popularity scheme driven popular allocation strategy with highly skewed popularity profile, exceeds the power function of popularity scheme driven popularity allocation strategy for the RAN resource cost saving. The RAN resource cost is the cost of availing the content directly from the network/RAN and not through D2D cluster.

FIG. 10B is a graph illustrating a comparison of a content access delay with respect to the plurality of cache allocation strategy at the edge node (100) in the wireless network, according to an embodiment as disclosed herein.

Referring to the FIG. 10B, the graph is a plot of the content access delay on the Y-axis Vs the content popularity profiles of the plurality of cache allocation strategy on the X-axis. The access delay is the delay in accessing the content once the content is transmitted from the network. The FIG. 10B indicates the delay in accessing the contents which are transmitted by the edge node (100) at the at least one UE (200) of the plurality of UEs.

Further, based on the FIG. 10B, the content access delay performance of the log function of popularity scheme driven popular allocation strategy crosses over the power function of popularity scheme driven popularity allocation strategy when a approaches 2.5, where a is an exponent value characterizing the Zipf distribution.

FIG. 10C is a graph illustrating a comparison of the RAN resource cost with respect to the plurality of cache allocation strategy at the edge node (100) in the wireless network, according to an embodiment as disclosed herein.

*204 Referring to the FIG. 10C, the graph is a plot of the RAN resource cost on the Y-axis Vs a contact rate on the X-axis. The contact rate is the rate at which the at least one UE of the plurality of UE interacts with the at least one other UE in the D2D cluster. The FIG. 10C indicates the impact of the contact rate on the RAN resource cost. The FIG. 10C includes three curves indicated by a, wherein a is the popularity profile. Based on the FIG. 10C, the at least one segment of the popular content which has higher value of a reduces the RAN resource cost. Therefore, the RAN resource cost reduces with increasing contact rates, more pronouncedly for skewed popularity distribution.

FIG. 10D is a graph illustrating a comparison of the RAN resource cost with respect to the readiness factor of the plurality of UEs in the wireless network, according to an embodiment as disclosed herein.

Referring to the FIG. 10D, the graph is a plot of the RAN resource cost on the Y-axis Vs the readiness factor of the plurality of UEs on the X-axis. The readiness factor of the plurality of UEs is the proportion of the UEs of the plurality of UEs which are ready to act as the content holders for caching in the wireless network. From, the FIG. 10D, when the number of UEs which are ready to act as content holders for caching in the wireless network increases, the RAN resource cost decreases. Also, content popularity distribution with larger a provide higher RAN resource cost saving even in region of lower readiness factor.

FIG. 10E is a graph illustrating the RAN resource cost for single-hop and multi-hop communication in the wireless network, according to an embodiment as disclosed herein.

Referring to the FIG. 10E, the graph is a plot of the RAN cost (Kbytes) on the Y-axis Vs deadlines (time slots) on the X-axis. The deadlines (time slots) are the maximum time limit allowed for the transfer of content in the wireless network. Therefore, for the at least one segment of the popular content with higher values of a, the RAN cost reduces when multi-hop communication is used, with the same deadline.

The use of the multi-hop communication enhances the spread of cached contents and brings in more interactions of the at least one UE in the D2D cluster which desires specific contents with the at least one UE which is acting as the content holder by allowing caching of the at least one segment of the popular content. As the interactions between the UEs within the D2D cluster increases, the transfer of the at least one segment cached at the UE over the D2D cluster increases and thereby reduces the RAN resource cost.

Consider that the log function of popularity scheme driven popular allocation strategy which favors the at least one segment with higher popularity during the cache allocation. The use of multi-hop communication along with the log function of popularity scheme driven popular allocation strategy further amplifies the spreading of the at least one segment with higher popularity since the popular contents are cached at greater number of UEs. As a result, a significantly higher RAN resource saving is seen as compared to the single-hop communication, more pronounced at higher α values. Therefore, the use of multi-hop communication provides benefits of suitably allowing multi-hop for low latency QoS services. The controlled application of the multi-hop communication for specific services can be executed with required signaling during the cache building operation so as to guide the caching UEs to appropriately carry out the multi-hop communication for indicated services set.

FIG. 10F is a graph illustrating the RAN resource cost for the plurality of segments with different popularity profile in case of contents with different QoS bounds in the wireless network, according to an embodiment as disclosed herein.

Referring to the FIG. 10F, the graph is a plot of the RAN cost (Kbytes) on the Y-axis Vs content popularity profile with various deadlines on the X-axis. The deadlines considered are T, T/2. 3T/4 which reflect different latency requirements for the set of services. The at least one segment of the popular content which are cached are disposed at the end of the deadlines and the content is again freshly received from the RAN. Further, shorter deadlines are challenging to meet and lead to higher RAN cost as interactions through the D2D clusters may not render the required contents for accessing the UEs adequately. For a service with a specific deadline, the RAN resource cost is reduced with increased skewdness of the popularity profile until the skewdness of the popularity profile decreases to the lowest value where no further decline may be possible. Therefore, the plurality of popular content are better spread through caching at the at least one UE. But the spread of the plurality of popular content is limited by the number of UEs which act as content holders for providing caching or the caching storage available to cater to the different QoS services etc.

FIG. 10G is a graph illustrating the RAN resource cost for the plurality of segments with different popularity profile in case of contents based on different mobility in the wireless network, according to an embodiment as disclosed herein.

Referring to the FIG. 10G, the graph is a plot of the RAN cost (Kbytes) on the Y-axis Vs content popularity profile based on the different mobility on the X-axis. The FIG. 10G evaluates the impact of the at least one UE of the plurality of UEs with different mobility states viz. high mobility, medium mobility and low mobility over the RAN resource cost. The counting response message sent by the at least one UE (200) to the edge node (100) includes the mobility information of the respective UE.

Further, based on the FIG. 10G, there is performance enhancement when the at least one UE selected for acting as content holder is highly mobile, as the interactions among the plurality of UEs in the D2D cluster increases which provides higher data transfer within the D2D cluster. Also, the effect is more striking with skewed popularity profile of the contents.

The embodiments disclosed herein can be implemented through at least one software program running on at least one hardware device and performing network management functions to control the elements. The elements shown in the FIGS. 1 to 10G include blocks, elements, actions, acts, steps, or the like which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for enabling distributed caching in a wireless network, the method comprising:
   receiving, by an edge node in the wireless network, a plurality of contents from a core network;
   determining, by the edge node, popular content from the plurality of contents;
   caching, by the edge node, the popular content in the edge node; and
   transferring, by the edge node, at least one segment of the popular content for caching to at least one user equipment (UE) of a plurality of UEs associated with the edge node.

2. The method as claimed in claim 1, wherein transferring, by the edge node, the at least one segment of the popular content for caching to the at least one UE of the plurality of UEs associated with the edge node comprises:
   splitting, by the edge node, the popular content into a plurality of segments;
   mapping, by the edge node, the at least one segment from the plurality of segments to a delivery mode from among a plurality of delivery modes;
   determining, by the edge node, at least one cache allocation strategy based on assistance information, received in at least one message from one or more of the plurality of UEs and associated with each of the plurality of UEs;
   selecting, by the edge node, the at least one UE from the plurality of UEs to act as at least one content holder for caching based on the at least one cache allocation strategy;
   scheduling, by the edge node, a delivery of the at least one segment of the popular content for caching at the at least one selected UE; and
   transferring, by the edge node, the at least one segment of the popular content to the at least one selected UE in the mapped delivery mode based on the scheduling.

3. The method as claimed in claim 2, wherein the delivery mode comprises one of a broadcast delivery mode, a multicast delivery mode and a unicast delivery mode.

4. The method as claimed in claim 2, wherein the at least one cache allocation strategy is at least one of a popularity blind allocation strategy, a log function of popularity scheme driven popular allocation strategy, power function of popularity scheme driven popularity allocation strategy and a mobility driven allocation strategy,
   wherein the popularity blind allocation strategy comprises caching the at least one segment of the popular content at more UEs,
   wherein the log function of popularity strategy comprises favoring the at least one segment of the popular content with higher popularity while performing cache allocation,
   wherein the popularity blind allocation strategy comprises treating each segment of service and/or each of the services equally,
   wherein the power function of popularity scheme driven popularity allocation strategy comprises favoring in accordance with power function the at least one segment of the popular content with higher popularity while performing cache allocation,
   wherein the log function of popularity scheme driven popularity allocation strategy comprises favoring in accordance with logarithmic function the at least one segment of the popular content with higher popularity while performing cache allocation, and
   wherein the mobility driven allocation strategy comprises favoring at least one UE with higher mobility to act as a content holder for performing cache allocation.

5. An edge node for enabling distributed caching in a wireless network, the edge node comprising:
   a memory;
   a processor coupled to the memory and configured to:
   receive a plurality of contents from a core network;
   determine popular content from the plurality of contents;
   cache the popular content in the edge node; and
   transfer at least one segment of the popular content for caching to at least one user equipment (UE) of a plurality of UEs associated with the edge node.

6. The edge node as claimed in claim 5, wherein the processor is configured to:
   split the popular content into a plurality of segments;
   map the at least one segment from the plurality of segments to a delivery mode;
   determine at least one cache allocation strategy based on assistance information received in at least one message from one or more of the plurality of UEs and associated with each UE of the plurality of UEs;
   select the at least one UE from the plurality of UEs to act as at least one content holder for caching based on the at least one cache allocation strategy, the assistance information associated with each of the plurality of UEs, a popularity of the at least one segment of the popular content, a D2D cluster, a group of the at least one segment of the popular content;
   schedule a delivery of the at least one segment of the popular content for caching at the at least one selected UE; and
   transfer the at least one segment of the popular content to the at least one selected UE in the mapped delivery mode based on the scheduling.

7. The edge node as claimed in claim 6, wherein the processor is configured to:
   determine the at least one segment of the popular content for applying a multi-hop communication; and
   transfer the at least one segment of the popular content to the at least one selected UE in the mapped delivery mode based on the scheduling, through the multi-hop communication.

8. The edge node as claimed in claim 6, wherein the delivery mode comprises one of a broadcast delivery mode, a multicast delivery mode and a unicast delivery mode.

9. The edge node as claimed in claim 6, wherein the at least one cache allocation strategy is at least one of a popularity blind allocation strategy, a log function of popularity scheme driven popular allocation strategy, power function of popularity scheme driven popularity allocation strategy and a mobility driven allocation strategy,
- wherein the popularity blind allocation strategy comprises caching the at least one segment of the popular content at more UEs,
- wherein the log function of popularity strategy comprises favoring the at least one segment of the popular content with higher popularity while performing cache allocation,
- wherein the popularity blind allocation strategy comprises treating each segment of service and/or each of the services equally,
- wherein the power function of popularity scheme driven popularity allocation strategy comprises favoring in accordance with a power function the at least one segment of the popular content with higher popularity while performing cache allocation,
- wherein the log function of popularity scheme driven popularity allocation strategy comprises favoring in accordance with logarithmic function the at least one segment of the popular content with higher popularity while performing cache allocation, and
- wherein the mobility driven allocation strategy comprises favoring the at least one UE with higher mobility to act as content holder for performing cache allocation.

10. The edge node as claimed in claim 6, wherein the processor is configured to receive the assistance information associated with each of the UE of the plurality of UEs by:
- sending a counting request message to the plurality of UEs, wherein the counting request message requests assistance information from the UEs to aid in a distributed caching and delivery operation; and
- receiving a counting response message from each of the UEs, wherein each of the counting response message comprises the assistance information associated with the UE.

11. The edge node as claimed in claim 6, wherein the assistance information comprises at least one of a service preference of the UE, a mobility information of the UE, a quality of service (QoS) requirement of the UE, a battery status of the UE, signal conditions at the UE, storage capacity of the UE, a caching capability of the UE, a probability of receiving contents through a device-to-device (D2D) cluster associated with the UE, and a cluster information field (CIF) indicating possible proximal communication link currently available for the UE, a readiness field indicating an interest/consent/willingness/authorization of the UE to offer cache and act as holder of content, wherein the readiness of the UE is dependent on at least one of a battery status, a storage availability, a signal conditions and a requirement of a same set of contents for use, a bandwidth and suitable access technology, or billing factors.

12. The edge node as claimed in claim 5, wherein the at least one UE is one of a master UE of a device-to-device (D2D) cluster, a relay UE, and an isolated UE.

13. The edge node as claimed in claim 5, wherein the processor is further configured to:
- receive the feedback from each of the UEs;
- measure a performance of the edge node based on the feedback; and
- determine at least one of a reward and an incentive to the at least one UE for contributing to the distributed caching and delivery operation.

14. The edge node as claimed in claim 5, wherein the processor is further configured to:
- determine a cache holding threshold time associated with the at least one segment of the popular content cached at the edge node; and
- perform one of flushing and clearing the at least one segment of the popular content cached at the edge node, in response to determining that the cache holding threshold time associated with the at least one segment of the popular content has elapsed.

15. The edge node as claimed in claim 5, wherein the processor is configured to:
- transfer the at least one segment of the popular content to the at least one UE using one of a multicast delivery mode and a broadcast delivery mode, wherein the one of the multicast delivery mode and the broadcast delivery mode is a Multimedia Broadcast Multicast Service (MBMS).

16. A user equipment (UE) for enabling distributed caching in a wireless network, the UE comprising:
- a memory;
- a processor coupled to the memory and configured to:
- receive a counting request message from an edge node, wherein the counting request message requests at least one UE from among a plurality of UEs associated with the edge node to aid in a distributed caching and delivery operation;
- send a counting response message to the edge node, wherein the counting response message incorporates assistance information from the plurality of UEs to aid in the distributed caching and delivery operation;
- receive at least one segment of a popular content from the edge node; and
- cache the at least one segment of the popular content in a cache memory of the UE.

17. The UE as claimed in claim 16, wherein the processor is further configured to:
- send feedback to the edge node after caching the at least one segment of the popular content; and
- receive a reward from the edge node for contributing to the distributed caching and delivery operation.

18. The UE as claimed in claim 16, wherein the processor is further configured to:
- share the at least one segment of the popular content with at least one other UE in a device-to-device cluster; and
- wherein the UE is one of a master UE of a device-to-device (D2D) cluster, a relay UE, and an isolated UE.

19. The UE as claimed in claim 18, wherein the processor is configured to:
- determine the at least one segment of the popular content for applying a multi-hop communication in the D2D cluster; and
- share the at least one segment of the popular content in the D2D cluster through the multi-hop communication.

20. The UE as claimed in claim 16, wherein the processor is further configured to:
- determine a cache holding threshold time associated with the at least one segment of the popular content cached at the UE; and
- perform one of flushing and clearing the at least one segment of the popular content cached at the UE, in response to determining that the cache holding threshold time associated with the at least one segment of the popular content has elapsed.

\* \* \* \* \*